Figure 3:
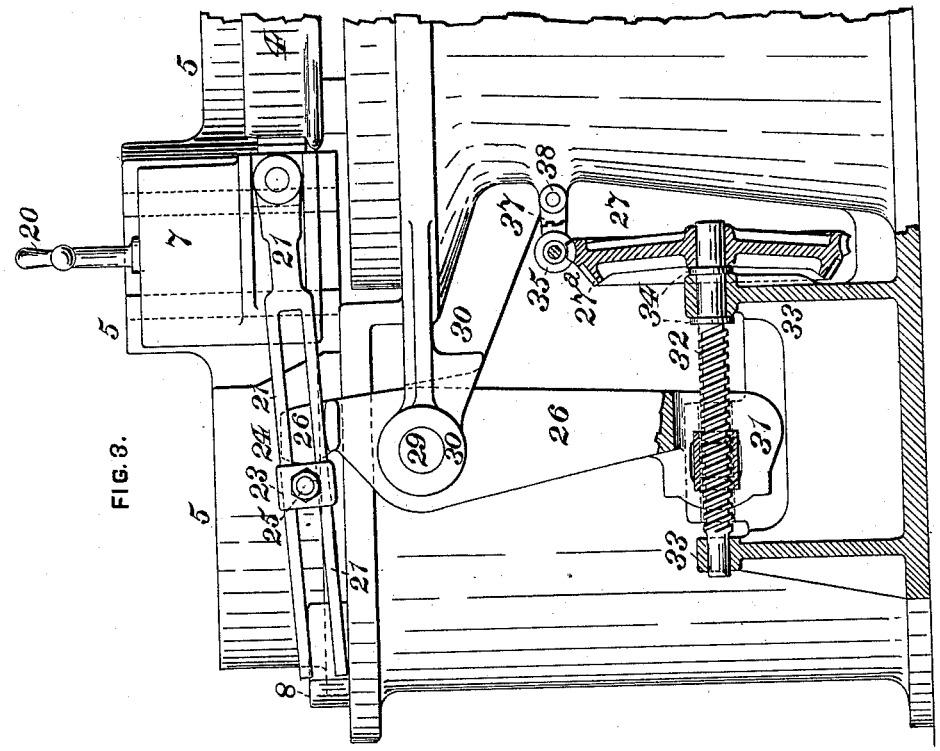

(No Model.) 4 Sheets—Sheet 1.
F. W. TAYLOR.
METHOD OF FEEDING THE SUPPORT OF A METAL CUTTING TOOL.
No. 387,121. Patented July 31. 1888.
FIG. I.
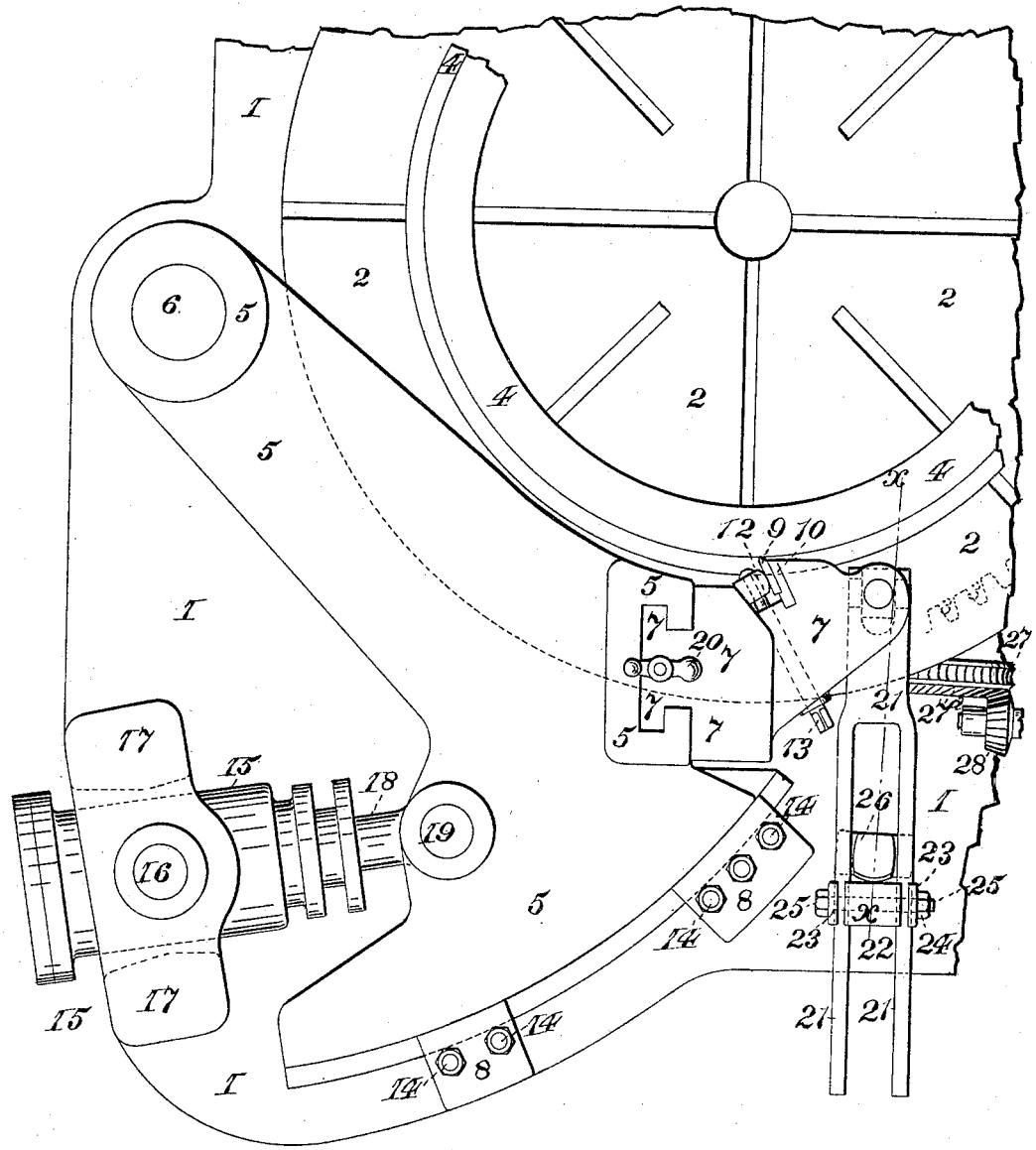
WITNESSES:
C. M. Clarke
F. E. Gaither
INVENTOR
Fred. W. Taylor,
by J. Snowden Bell
ATTORNEY (No Model.) 4 Sheets—Sheet 2.

F. W. TAYLOR.
METHOD OF FEEDING THE SUPPORT OF A METAL CUTTING TOOL.

No. 387,121. Patented July 31, 1888.

WITNESSES:
C. M. Clarke
F. E. Gaither

INVENTOR.
Fred. W. Taylor.
by J. Snowden Bell,
ATTORNEY.

(No Model.) 4 Sheets—Sheet 3.

F. W. TAYLOR.
METHOD OF FEEDING THE SUPPORT OF A METAL CUTTING TOOL.

No. 387,121. Patented July 31, 1888.

WITNESSES:
C. M. Clarke.
F. E. Gaither.

INVENTOR,
Fred. W. Taylor,
by
ATTORNEY.

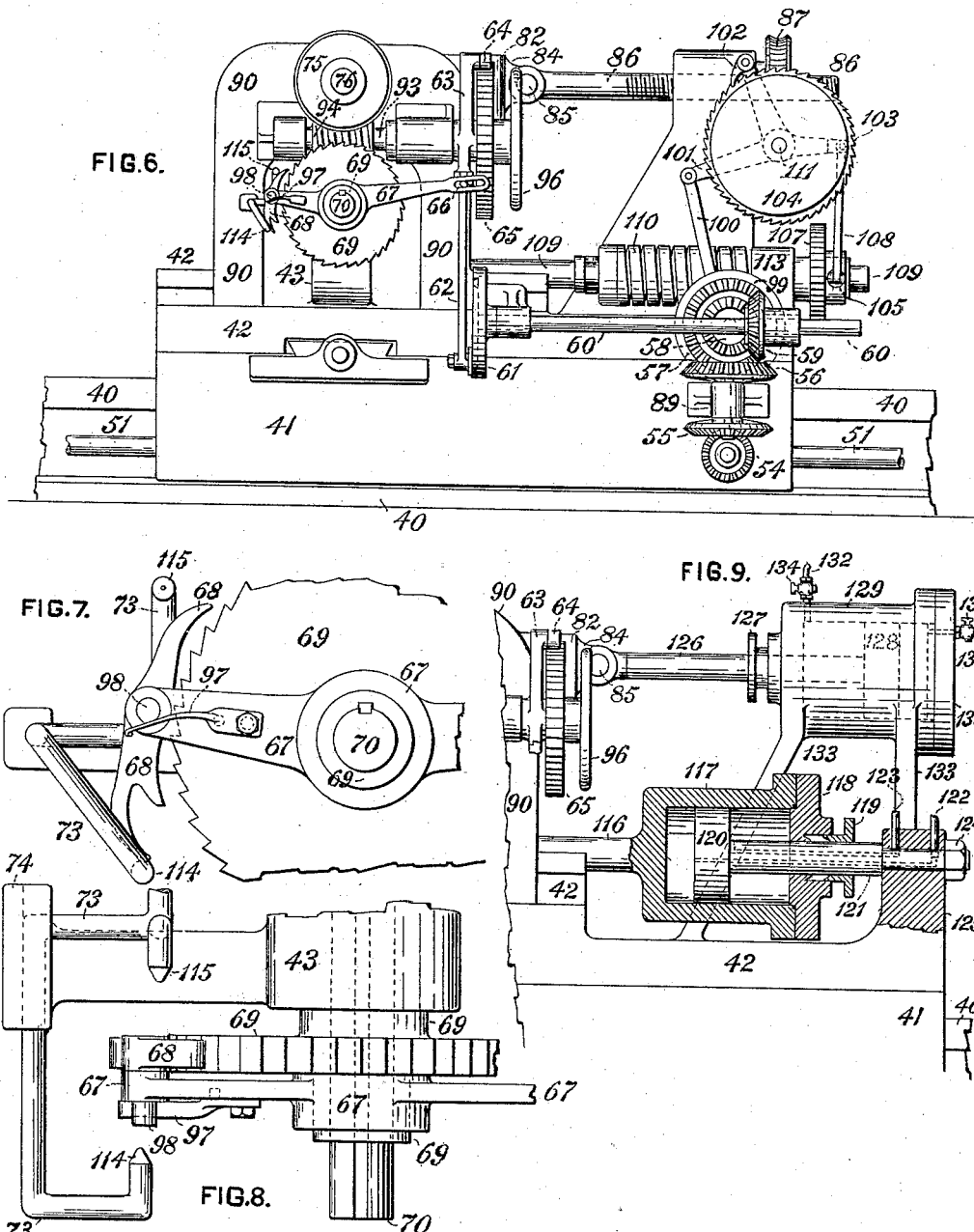

UNITED STATES PATENT OFFICE.

FREDERICK W. TAYLOR, OF PHILADELPHIA, PENNSYLVANIA.

METHOD OF FEEDING THE SUPPORT OF A METAL-CUTTING TOOL.

SPECIFICATION forming part of Letters Patent No. 387,121, dated July 31, 1888.

Application filed August 26, 1887. Serial No. 247,932. (No model.)

*To all whom it may concern:*

Be it known that I, FREDERICK W. TAYLOR, of the city and county of Philadelphia, in the State of Pennsylvania, have invented a certain new and useful Improvement in Feeding-Tool Supports for the Cutting-Tools of Lathes, Boring-Machines, and other Machine-Tools, of which improvement the following is a specification.

My invention relates to improvements in the manner of causing the cutting-tools used in machine-tools—such as lathes, boring-mills, &c.—for altering the form and dimensions of pieces of metal, wood, stone, and other materials, commonly called "work," to advance into the work while a portion of the material composing the work is being removed therefrom by the tool.

As it is necessary in altering the dimensions and shape of the work with a cutting-tool in machine-tools, by removing part of the material of which the work is composed, that the cutting-tool and the work shall have two distinct motions, one with relation to the other— namely, a "feeding motion" and a "driving motion"—it will be advisable to explain preliminarily the difference between these two motions. The meaning and application herein of the terms "driving" the work or tool and "feeding" the work or tool will be best understood from a description of the operations of producing a plane surface on work and turning the surface of work to a cylindrical contour.

In the case of producing a plane surface on work, after the tool and the work are brought in contact, either the tool or the work is caused to reciprocate backward and forward in a straight line, and each reciprocating movement, either backward or forward, of the work or the tool is called a "stroke" of the planing-machines. The tool and the work are then forced together, so that the tool embeds itself into the work, and during the first stroke of the planing-machine the tool will remove a portion of the material of which the work is composed, which is called a "chip" or "shaving." Assuming that the tool or the work, as the case may be, continues its reciprocating motion backward and forward, but that the tool and the work do not otherwise change their relative positions, it is evident that the tool will remove no more chips from the work. It is clear that if the tool is to continue to remove chips from the work, in addition to the reciprocating motion of the tool or the work, either the tool or the work must have an additional motion, one with relation to the other. There are two distinct motions, then, necessary in producing a plane surface on work:

First. The reciprocating movement, either of the work or the tool. If the work is reciprocated this is called "driving" the work, and if the tool is reciprocated it is called "driving" the tool.

Second. A change of the relative positions of the work and the tool in some other direction than that of this reciprocating movement. If the work is moved in this direction with relation to the tool, this motion is called "feeding" the work, and if the tool is moved in this direction with relation to the work it is called "feeding" the tool.

In the case of altering the form of the work and removing a portion of it by turning the work with a tool, after the work and the tool have been brought in contact with one another, either the work is made to rotate past the tool or the tool to revolve around the work. During the first rotation of the work past the tool or of the tool around the work a certain portion of the work is removed in the form of chips or shavings, as in the case of drilling or planing the work. Unless, however, some motion other than this movement of rotation is imparted to the work or the tool relatively to one another after the first rotation is complete, no more chips will be removed from the work. It is clear, then, that if the tool is to continue to remove chips from the work that, in addition to the rotating motion of the tool or the work, either the tool or the work must have an additional motion, one with relation to the other.

The two distinct motions which are necessary in turning work are:

First. The rotary motion of the work or the tool. If the work is rotated past the tool, this motion is called "driving" the work, and if the tool is made to revolve around the work it is called "driving" the tool.

Second. A change of the relative positions of the work and the tool in some other direction than that of this rotary movement. If the work is moved in this direction in relation to the tool, this motion is called "feeding" the work, and if the tool is moved in this direction with relation to the work it is called "feeding" the tool.

In general, then, in machine-tools used for altering the form of work by removing part of the material of which the work is composed, by means of a cutting-tool or other medium, it is necessary that the work and the medium for removing portions of the work shall have two motions with relation one to the other. The lesser of these two motions is commonly called the "feeding" motion, and the greater of the two motions the "driving" motion. The mechanism or devices used for producing the driving motion is commonly called the "driving mechanism" or "driving motion" of the machine, and the mechanism or devices for producing the feeding motion is commonly called the "feed mechanism" or "feed-motion" of the machine.

Feed-motions for machine-tools may be divided into two general classes: first, those which are used to advance the cutting-tool toward the work, and which I shall designate as "feed-motions for cutting-tools," and, second, those which are used to advance the work toward the cutting-tool, which I shall term "feed-motions for the work." As my invention relates to the method used in feeding a cutting-tool toward the work, feed-motions of the second class need not be herein considered. Feed-motions for cutting-tools may be further classified into automatic and hand motions. An automatic feed-motion is one in which the cutting-tool is caused to advance toward the work or "fed" by a train of gearing or mechanism which is during its action independent of the operator of the machine, requiring only to be started and stopped by him, while a hand-feed is one in which the tool is fed either exclusively or partially during its operation by the operator. Feed-motions may be further classified as intermittent or uniform.

A uniform feed-motion is one which throughout its action is maintained at a uniform rate, while an intermittent feed-motion is one which does not maintain a uniform rate throughout its action, the tool being fed more rapidly during some portions of its action than at others or the action of the feeding being entirely stopped during portions of the time that the tool is cutting. The hand feed-motions heretofore used consist of a series of gears, a screw, or a train of mechanism of some kind, which is connected to some one of the tool-supports to which the tool is attached or upon which it is mounted, and some portion of which is propelled by the operator of the machine. The automatic feed-motions consist of mechanism similar to those used for hand feeding, except that some portion of the mechanism is propelled either by a prime mover independent of the machine or by some portion of the driving mechanism of the machine.

The cutting-tool used in a machine-tool is held and supported by different parts of the machine, which are called "tool-supporting members" or "tool-supports," the various tool-supports which are used being called by different names, according to the special uses to which they are applied. The devices—such as tool-posts, chucks, or clamps—which are ordinarily used for attaching the tool to the machine are known as "tool-holders." The tool-holder is generally mounted on, attached to, or part of a movable part of the machine, which is supported and guided in its motions by other parts of the machine. The movable tool support, to which the tool is attached, is termed the "tool-slide." In the case of the lathe, planer, and boring-mill the tool-slide is generally a piece of metal planed so as to have dovetailed or flanged surfaces which fit in or over other corresponding dovetailed or flanged surfaces, and it is guided and supported by these surfaces while the cutting-tool is fed up to and into the work. This tool-slide is frequently mounted upon another movable tool-support, which is guided and supported in a manner similar to that of the tool-slide, with the object of advancing or feeding the cutting-tool in two different directions. In the case of the boring-mill and planer, and in some cases in the lathe, the tool-supporting member upon which the tool slide is mounted is called the "saddle." The saddle of a planer or boring-mill is ordinarily mounted upon another movable tool support called the "cross-head," while in the lathe the movable tool-support on which the saddle is mounted is called the "lathe-carriage," the lathe-carriage being that portion of the machine which rests upon, is guided by, and is traversed or fed along the shears or bed of the lathe. In many lathes, however, the tool-slide is mounted directly upon the lathe-carriage. In this case the tool-slide is sometimes called the "lathe-saddle" as well as the tool-slide.

It is frequently necessary that the cutting-tool in a lathe or boring-mill or other machine-tool should be fed in two directions at the same time—as, for example, in turning a taper on a piece of work in a lathe it is often necessary that the tool should be made to feed toward the live head of the machine and at the same time to approach or recede from the central axis of the work in the lathe. This has been accomplished in the case of the lathe by feeding one of the tool supports in two directions at the same time. For instance, in the case of the lathe, if the tool-slide be mounted upon the carriage of the lathe in such manner that it can be slid in its guides so as to approach or recede from the central axis of the lathe, and the carriage be mounted on the slides of the lathe in such manner that it can be made to approach or recede from the live head of the lathe, the direction in which the tool-slide moves relatively to the carriage will be at right angles to the direction in which the carriage moves on the shears of the lathe. If, now, the tool-slide be moved in its guides toward the central axis of the lathe, and the carriage at the same time be moved along the shears toward the live head of the lathe, the tool-slide is said to be fed in two directions at the same time, while the carriage is said to be fed in only one direction.

However finely the parts of the machine-tool may be fitted together, there will be more or less lost motion or play between the joints of the movable tool-supports mounted one upon another—as, for instance, between the adjacent surfaces of the tool-slide and the saddle, the saddle and the cross-head, or the saddle and the carriage, as the case may be, and between the carriage and the shears of the machine. When the tool is removing shavings or chips from the work, it is subjected to a pressure proportional to the sectional area of the shaving which it is removing from the work and dependent in amount upon the quality of the material of which the work is composed and the condition of the tool itself. This pressure of the work upon the tool causes all of the parts which support the tool to deflect more or less, owing to the fact that they are themselves more or less elastic, and that there is lost motion or play in each of the joints, as hereinbefore described. Now, if the pressure between the work and the tool remained constant, the deflection of the parts supporting the tool would be unimportant. The tool, however, in removing the shaving from the work, generally breaks it up into a series of small parts, and just after each of these small parts is broken away from the work the pressure between the work and the tool is very much diminished. As the pressure on the tool diminishes, the deflection of the parts supporting the cutting-tool also diminishes, so that the cutting-tool and the tool-supports on which it is mounted are made to vibrate backward and forward while it is cutting. This vibration, or "chatter," as it is technically termed, of the tool and tool supports frequently seriously affects the finish of the work, causing it to be rough when it should be smooth. In all feed-motions heretofore made there is more or less lost motion, and this also causes the tool to chatter at times.

In feed-motions heretofore used for feeding the tool against the work the pressure of the feed-motion upon the movable tool-support has been in general in the direction in which it is desired that the tool-support should move; and this pressure has always been proportional to the resistance which the work offered to the advance of the tool, being greater as the pressure between the tool and the work became greater, and less when this pressure became less. As a consequence there has always been more or less spring and deflection in any form of feed-motion; and with feed-motions as heretofore used it frequently requires considerable time for the tool to take its full cut after it comes in contact with the work. This defect in feed-motions is particularly apparent and objectionable when a tool with a broad cutting-edge is being fed with a fine feed into work, as under these conditions it often requires more time to cause the parts of the feed motion and the tool-support to deflect to their full extent than it does to finish the work which the tool is doing after they have deflected to their full extent. For the same reason with feed-motions heretofore used it has frequently been difficult to stop the tool from advancing into the work at the precise point desired, since the elasticity of the feed-motion frequently causes the tool to advance after the actual driving of the feed-motion has ceased.

In the method of feeding which has heretofore been used the resistance which it has been necessary to overcome during the operation of causing the tool-support to advance has consisted of three elements: first, the resistance which the work offers to the advance of the tool; second, the friction between the tool-support which is being fed and the part or parts upon which it is mounted, and, third, the friction developed between the various parts of the feed-motion proper. Both the second and third elements of the resistance which had to be overcome during the operation of feeding were dependent in their magnitude upon the magnitude of the first element, since the friction of the tool-support as well as of the feed-motion increased with an increase of the pressure of the work on the tool, and diminished with a diminution of this pressure.

Inasmuch as the pressure on the feed-motion has been proportional to the pressure of the work on the tool, with feed-motions heretofore used great exertion has been required to operate a feed-motion by hand when the tool was taking a heavy cut, and, owing to the variable pressure required to feed a tool, it was frequently difficult when feeding by hand to exert exactly the proper pressure upon the feed-motion to produce the rate of advance of the tool. In feed-motions as heretofore constructed it has been usual to transmit all of the power required to operate the feed-motion through the portion of the feed-motion which regulates the rate of the feed. This portion of the feed-motion consists, in the case of automatic feed-motions, in some cases of gears which could be changed and replaced with others of different proportions, so as to vary the rate of feed, and in others of friction plates or disks, the speed of which could be so varied as to vary the rate of the feed. In the case of hand feed-motions the rate of the feed has been varied by the varying rapidity with which the person operating the feed caused the feed to be moved; but in each case all of the power required to operate the feed has been transmitted through the portion of the feed-motion which regulates the rate of the feed. In cases in which the power required to feed the tool is large the necessity of transmitting all of the feeding power through the entire feed-motion is a material disadvantage, since it is necessary that the portion of the feed-motion for regulating the rate of the feed should be either very heavy and cumbersome, or that it be run at a high rate of speed, either of which conditions is objectionable.

In general the defects which have been developed in the operation of feed-motions hereinbefore mentioned may be stated, briefly, to be due to the following causes: first, the elasticity of the parts supporting the tool, such as the tool-slide, saddle, carriage, &c.; second, the lost motion or play in the joints of the parts supporting the tool; third, the elasticity and deflection and lost motion in the parts of the feed-motion proper; fourth, the tendency of the pressure of the feed motion to push the parts supporting the tool in one direction, while the pressure of the work upon the tool tends to force these parts in the opposite direction; fifth, the fact that the pressure exerted upon feed-motions as heretofore constructed in order to operate them has been a variable one, its amount being dependent upon the pressure between the tool and the work.

My invention is designed to obviate the objections above indicated as obtaining in feed-motions as heretofore constructed, and its special objects are, first, to cause the tool-support to be fed in such manner that the lost motion in the mechanism employed in advancing the tool-support and in regulating the rate at which the tool-support advances shall be taken up before the tool comes in contact with the work in the same direction and to approximately the same extent as this lost motion is taken up after the tool comes in contact with the work; second, to cause the tool-support to be fed in such manner that it shall deflect before the tool has come in contact with the work to approximately the same extent and in the same direction (as far as it is practicable to accomplish this end with one feed-motion) as it (the tool support) would deflect after the tool is operating upon the work; third, to cause a movable tool-support to be fed in such manner that the lost motion between the joints of this tool-support and the part upon which it is mounted shall be taken up before the tool has come in contact with the work to approximately the same extent and in the same direction, (as far as it is practicable to accomplish this end with the use of one feed-motion,) as the lost motion would cause the tool-support to vibrate or chatter after the tool is operating upon the work; fourth, to cause a movable tool-support to be fed in such manner that not only the tool-support which is being fed, but also one or more other tool-supports upon which it is mounted, or which are mounted upon it, shall deflect before the tool has come in contact with the work to approximately the same extent and in the same direction (as far as it is practicable to accomplish this end with the use of one feed-motion) as they (the tool-supports) would deflect after the tool is operating upon the work; fifth, to cause a movable tool-support to be fed in such manner that not only the lost motion in the joints of the tool-support which is being fed, but also the lost motion in the joints of other tool-supports mounted upon it, or upon which it is mounted, shall be taken up before the tool has come in contact with the work to approximately the same extent and in the same direction, (as far as it is practicable to accomplish this end with the use of one feed-motion,) as the lost motion would cause these tool-supports to vibrate or chatter after the tool is operating upon the work; sixth, to cause a movable tool-support, which is mounted upon one or more other tool-supports, or which has one or more other tool-supports mounted upon it, to be fed in such manner that not only it, but the other tool-supports mounted upon it, or upon which it is mounted, shall deflect in the same direction and to approximately the same extent as the pressure of the work upon the tool would cause them to deflect, even although the direction of the pressure of the work upon the tool be different from the direction in which the tool-support is being fed; seventh, to cause a movable tool-support which is mounted upon one or more other tool-supports, or which has one or more other tool-supports mounted upon it, to be fed in such manner that the lost motion in the joints of this tool-support, as well as the lost motion in the joints of the other tool-supports which are mounted upon it, or upon which it is mounted, shall be taken up by the operation of feeding to approximately the same extent and in the same direction, as the lost motion would cause those parts to vibrate or chatter after the tool is operating on the work; eighth, to cause a movable tool-support to be fed in such manner that the power required in operating the mechanism which regulates the rate at which the tool-support is fed (whether this mechanism be operated by hand or automatically) shall decrease with the increase of the pressure of the work on the tool; ninth, to cause a movable tool-support to be fed in such manner that the power required to operate the mechanism which regulates the rate of the feed, whether the rate of the feed be regulated by hand or automatically, shall be a fraction only of the power required to feed the tool; tenth, to cause a movable tool-support to be fed in such manner that the friction of the various elements which constitute the train of mechanism used for regulating the rate at which the tool-support advances shall exert an advantageous instead of a disadvantageous action in permitting the members of the train of feed mechanism to be made relatively lighter than those of the ordinary feed-motions the farther they are located from the cutting-tool.

My invention embodies as its leading characteristic feature two essential operations, which, generally stated, are as follows:

The first, which I term "the operation of feeding or advancing the tool-support," consists in transmitting a pressure to the tool-support in general in the direction in which it is desired to feed it. It is not essential that this pressure should be uniform throughout the time of its action; but it is very desirable that it should be uniform, since it then maintains the tool-support under a uniform strain, and therefore under uniform conditions, as far as lost motion and deflection are concerned, throughout the time of its action, thus rendering the operation of feeding much simpler and requiring less skill on the part of the operator than has heretofore been required. The mechanism which is used in thus producing and transmitting the pressure to the tool-support which is necessary to feed it I shall call an "advancing mechanism." As an example of the advancing mechanism which I consider best adapted for exerting and transmitting this pressure, I would mention one which consists, preferably, of a cylinder containing water, steam, or other fluid under compression, which exerts a uniform pressure upon a plunger or piston in the cylinder, and which pressure is transmitted either directly from the plunger or piston-rod, or indirectly through a train of gearing, or a lever or series of levers, or other suitable means of transmitting pressure, to the slide or part supporting the tool which it is desired to advance.

As an alternate form of advancing mechanism adapted to perform the same functions as that above specified, although with a lesser degree of effectiveness, there may be employed a friction-clutch, through which the necessary power required to cause the tool to feed could be transmitted. This clutch could be adjusted so as to slip when the slide to which the advancing mechanism was attached had been subjected to the proper pressure. The mechanism for transmitting the power from the friction-clutch to the slide could be varied in a variety of ways to suit the particular case of each feed-motion. As another alternate form of advancing mechanism, a pair of tight and loose pulleys may be provided, upon the tight pulley of which pair a belt would be run for transmitting the necessary power for causing the tool to feed until the pressure upon the slide which it was desired to advance had reached a certain desired maximum. The belt could then be automatically or otherwise shifted to the loose pulley until it was again required for producing pressure upon the slide. In the meantime the advancing pressure already developed by the belt could be made to act continuously and approximately uniformly upon the slide through the elasticity of the part of the advancing mechanism lying between the driving-pulley and the slide which it was desired to advance, or by means of a spring interposed in some part of the mechanism lying between the driving-pulley and the slide. Neither of these alternate forms of advancing mechanism are, however, as simple, complete, or desirable as the hydraulic cylinder first before mentioned.

The second of the essential operations before referred to, and which I term "the operation of governing the rate of feed or advance of the tool-support," consists in opposing a resistance to the advance of the tool-support during and as a part of the operation of regulating the rate of advance by the institution of a pressure acting in reverse direction to the pressure by which the tool is advanced, so that the mechanism which is used in regulating the rate of advance shall be kept continually under strain from the pressure exerted upon the tool-support in advancing the same. I have termed the mechanism thus used in governing the rate of advance of the tool-support "a rate-governing mechanism." The rate-governing mechanism may consist either of a train of gears or gearing, in combination with a screw, and is susceptible of an infinite variety of forms. It may be similar in all respects to ordinary feed-motions as heretofore used, except that, instead of being used to advance the tool by exerting a pressure upon one of the slides supporting it, the rate-governing mechanism acts in the manner of an escapement, regulating the rate at which the advancing mechanism, which acts in conjunction with it, feeds the tool. If the feed-motion is to be automatic, the rate of feed would be governed by the relative proportions of the gearing or screws, &c., of which the rate-governing mechanism was composed. If it were to be fed by hand, the rate of the feed would be at the discretion of the operator.

A special and marked difference is to be noted between the ordinary feed mechanism and a rate-governing mechanism adapted for use in the practice of my invention—to wit, that owing to the friction of the parts of the ordinary feed-motion only a small fraction of the power which is used to drive the feed-motion is transmitted to the slide or tool-support which it is desired to advance, the greater part of the power being ordinarily absorbed in the friction of the parts of the feed-motion, while in the case of the rate-governing mechanism the friction of the parts acts usefully and effectively, instead of being a disadvantage, for the reason that it diminishes the stress that would otherwise be induced upon the parts of the rate-governing mechanism, which are more remote from the slide upon which it is operating, thus allowing them to be much lighter and less cumbersome than those of the ordinary feed-motion.

Whatever mechanism may be used in transmitting to the tool-support the pressure which causes it to advance, or whatever mechanism is used in regulating the rate of advance of the tool-support, there must be in each case a point or a line which is known in mechanics as "the center of pressure" of the force or forces which in the case of the advancing mechanism are transmitted therefrom to the tool-support, and in the case of the rate-governing mechanism are received by said mechanism from the tool-support.

To illustrate what is meant by "the center of pressure," let it be supposed that the pressure which causes the advance of the tool-support is transmitted thereto through a piston-rod which receives pressure from the water in a hydraulic cylinder. The pressure transmitted through this rod may be exerted upon the tool-support through any convenient form of bearing which the end of the rod may have upon the tool support, and the pressure will then be imparted to the tool-support at a great number of points in this bearing. The aggregate of the several pressures which are imparted to the tool-support at the various parts of this bearing produces the same effect upon the tool-support as would a single pressure which is imparted to the tool support from the piston-rod in the direction of the center line or axis of the piston-rod, and is equal in amount to the sum of the several pressures transmitted to the bearing. The center line of pressure of the piston rod upon the tool-support would in such case be the axis of the piston-rod. Again, supposing the pressure which causes the tool-support to advance to be transmitted to it through a screw, the threads of which have a bearing in the tool-support or some part attached to it, the pressure which in this case causes the tool-support to advance would be transmitted to said support at a great number of points at which the threads of the screw press upon the threads of the nut in which it fits. The center of pressure of the screw upon the tool support would, however, be the axis of the screw. Again, if the tool-support be made to advance by means of a pressure which the tooth or teeth of a rack which is stationary exert upon the tooth or teeth of a gear-wheel which is mounted upon and made to rotate on the tool-support with its teeth engaging the teeth of the rack, the pressure which causes the tool-support to advance would be transmitted from the teeth of the rack to the teeth of the gear-wheel at a great number of points at which these teeth come in contact. There exists in this case a single line along which, if a pressure were transmitted to the tool-support equal to that which the teeth of the rack exert upon the teeth of the gear, exactly the same effect would be produced upon the tool-support as is produced by the pressure of the teeth of the rack against the teeth of the gear. This line is in this case called the "center of pressure."

In the case of any advancing mechanism or any rate-governing mechanism, at however many points the pressure may be transmitted, in one case from the advancing mechanism to the tool-support and in the other case from the tool-support to the rate-governing mechanism there is always at each instant of the operation of the feed-motion a center line of pressure along which in the case of the advancing mechanism a pressure might be transmitted which, if equal in amount to the sum of the pressure transmitted through the advancing mechanism, would produce the same effect upon the tool-support as is actually produced by the advancing mechanism, and which in the case of the rate-governing mechanism, if equal in amount to the resistance offered by the rate-governing mechanism to the advance of the tool-support, would produce the same effect as is produced by the pressure of the rate-governing mechanism; and in using the term "center of pressure" throughout this specification I refer to the imaginary line which is known as such in mechanics and is so referred to in standard works upon that subject.

My invention in general terms consists—

First. In causing a tool-support which is being fed in a single direction to move relatively to the tool-support, or other parts upon which it is mounted, by means of a pressure which is transmitted either directly to it or to a part or parts mounted upon it, and at the same time, during and as a part of the operation of regulating the rate at which the tool-support advances, in exerting a pressure upon the tool-support which opposes its advance, and in locating the centers of pressure of the pressure which causes the tool-support to advance, and of the resisting pressure offered to its advance during the operation of regulating its rate of advance at different points upon the tool-support, so as to cause the lost motion in the joints of the tool-support to be taken up and the tool support to deflect in the same direction as the pressure of the work upon the tool causes the lost motion to be taken up and the tool-support to deflect as far as is practicable to attain these objects with a single feed-motion, and at the same time to cause the lost motion and deflection in the parts of the feed-motion to be taken up even before the tool comes in contact with the work, thus avoiding to a still greater extent the chatter and irregularity in feeding the tool than in the first case above referred to, while at the same time the tool-support is only being fed in one direction, thus allowing work to be done with a wide-nosed tool or cutter, which is advanced directly into the work.

Second. In causing a movable tool-support which is being fed in a single direction to move relatively to the tool-support, or other part upon which it is mounted, by means of a pressure which is transmitted either directly to it or to a part or parts mounted upon it, and at the same time, during and as a part of the operation of regulating the rate at which the tool-support advances, in exerting a pressure upon the tool-support which opposes its advance, the pressure which causes the tool-support to advance tending in the same direction in which it is desired that the tool support shall advance, while the resistance offered to the advance of the tool-support during the operation of governing its rate of advance tends in the opposite direction to that in which it is desired that the tool-support shall advance, and in locating the centers of pressure of the pressure which causes the tool-support to advance, and of the resisting pressure offered to its advance during the operation of regulating its rate of advance at different points upon the tool-support, so as to cause the lost motion in the joints of the tool-support to be taken up, and the tool support to deflect in the same direction as the pressure of the work upon the tool causes the lost motion to be taken up and the tool-support to deflect, thus preventing the chatter and lost motion in the tool-support and in the feed motion, while at the same time the tool-support is only fed in one direction, thus allowing work to be done with a wide-nosed tool or cutter, which is advanced directly into the work.

Third. In causing a tool-support which is being fed in a single direction, and which has one or more tool-supporting members mounted upon it, to move relatively to the tool-support, or other parts upon which it is mounted, by means of a pressure which is transmitted either directly to it or to a part or parts attached to it, and at the same time, during and as a part of the operation of regulating the rate at which the tool-support advances, in exerting a pressure upon the tool-support which opposes its advance, and in locating the center of pressure of the pressure which causes the tool-support to advance upon some portion of the tool-support, while the center of pressure of the pressure which offers resistance to the advance of the tool-support during the operation of regulating its rate of advance is located upon a tool-supporting member mounted upon the tool-support, thus causing not only the tool-support upon which the advancing pressure is exerted to deflect and to have its lost motion taken up, but also causing the other tool-supporting member which is mounted upon said tool-support, or upon which it is mounted, to have its lost motion taken up and to deflect in the same direction as the pressure of the work on the tool would cause the tool-supports to deflect and would take up their lost motion, while at the same time the tool-support is only fed in one direction, thus allowing work to be done with a wide-nosed tool or cutter, which is advanced directly into the work.

Fourth. In causing a tool-support which is being fed in a single direction, and which has one or more tool-supporting members mounted upon it, to move relatively to the tool-support, or other parts upon which it is mounted, by means of a pressure which is transmitted either directly to it or to a part or parts attached to it, and at the same time, during and as a part of the operation of regulating the rate at which the tool support advances, in exerting a pressure which opposes its advance, the pressure which causes the tool support to advance tending in the same direction in which it is desired that the tool-support shall advance, while the resistance offered to the advance of the tool-support during the operation of governing its rate of advance tends in the opposite direction to that in which it is desired that the tool-support shall advance, and in locating the center of pressure of the pressure which causes the tool support to advance upon some portion of the tool-support, while the center of pressure of the pressure which offers resistance to the advance of the tool-support during the operation of regulating its rate of advance is located upon a tool-supporting member mounted upon the tool-support, thus causing the lost motion in the feed mechanism to be taken up and the feed mechanism to deflect in the same direction before the tool comes in contact with the work, as the lost motion would be taken up and the feed mechanism would be made to deflect after the tool comes in contact with the work, and thus causing not only the tool-support upon which the advancing pressure is exerted to deflect and to have its lost motion taken up, but also causing another tool-support mounted upon the former, or upon which it is mounted, to have its lost motion taken up and to deflect in the same direction as the pressure of the work on the tool would cause these tool supports to deflect and would take up their lost motion, while at the same time the tool-support is only fed in one direction, and therefore allowing work to be done with a wide-nosed tool or cutter, which is advanced directly into the work.

Fifth. In causing a tool-support which is being fed in a single direction to move relatively to the tool-support, or other parts upon which it is mounted, by means of a pressure which is transmitted either directly to it or to a part or parts attached to it, and at the same time, during and as a part of the operation of regulating the rate at which the tool-support advances, in exerting a pressure upon the tool-support which opposes its advance, the pressure which causes the tool support to advance being practically uniform throughout its period of action, while the resisting pressure offered to the tool-support during the operation of governing its rate of advance varies inversely as the pressure of the work on the tool—that is, becomes less as this pressure becomes greater, and greater as this pressure becomes less—and in locating the centers of pressure of the pressure which causes the tool-support to advance, and of the resisting pressure offered to its advance during the operation of regulating its rate of advance at different points upon the tool-support, so as to cause the lost motion in the joints of the tool-support to be taken up and the tool support to deflect in the same direction as the work upon the tool causes the lost motion to be taken up and the tool-support to deflect, and to place the tool support under a practically uniform strain throughout the period that it is being fed in only one direction, and therefore allowing work to be done with a wide-nosed tool or cutter, which is advanced directly into the work.

Sixth. In causing a tool support which is being fed in a single direction to move relatively to the tool-support, or other parts upon which it is mounted, by means of a pressure which is transmitted either directly to it or to a part or parts mounted upon it, and at the same time, during and as a part of the operation of regulating the rate at which the tool-support advances, in exerting a pressure upon the tool-support which opposes its advance, the pressure which causes the tool-support to advance being practically uniform throughout its period of action and tending in the same direction in which it is desired that the tool support shall advance, while the resisting pressure offered to the tool-support during the operation of governing its rate of advance varies inversely as the pressure of the work upon the tool—that is, becomes less as this pressure becomes greater, and greater as this pressure becomes less—and tends in the opposite direction to that in which it is desired that the tool-support shall advance, and in locating the centers of pressure of the pressure which causes the tool-support to advance, and of the resisting pressure offered to its advance during the operation of regulating its rate of advance at different points upon the tool-support, so as to cause the lost motion in the joints of the tool-support to be taken up and the tool-support to deflect in the same direction as the pressure of the work upon the tool causes the lost motion to be taken up and the tool support to deflect. The effect of this method of feeding is to place the tool support under a practically uniform strain throughout the period that it is being fed, thereby rendering the deflection of the feed mechanism uniform and taking up the lost motion of the feed mechanism uniformly, while at the same time the tool-support is only fed in one direction, which allows work to be done with a wide-nosed tool or cutter, which is advanced directly into the work.

Seventh. In causing a tool-support which is being fed in a single direction, and which has one or more tool-supporting members mounted upon it, to move relatively to the tool-support, or other parts upon which it is mounted, by means of a pressure which is transmitted either directly to it or to a part or parts attached to it, and at the same time, during and as a part of the operation of regulating the rate at which the tool-support advances, in exerting a pressure upon the tool-support which opposes its advance, the pressure which causes the tool-support to advance being practically uniform, while the resisting pressure offered to the tool-support during the operation of governing its rate of advance varies inversely as the pressure of the work upon the tool—that is, becomes less as this pressure becomes greater, and greater as this pressure becomes less—and in locating the center of pressure of the pressure which causes the tool-support to advance upon some portion of the tool-support, while the center of pressure of the pressure which offers resistance to the advance of the tool-support during the operation of regulating its rate of advance is located upon a tool-supporting member mounted upon the tool-support, thus causing not only the tool support to which the advancing pressure is transmitted, but also one or more tool-supporting members which are mounted upon it, or upon which it is mounted, to deflect and to have their lost motion taken up to a practically uniform extent throughout the period of action of the feed mechanism, while at the same time the tool-support is only fed in one direction, and therefore allowing work to be done with a wide-nosed tool or cutter, which is advanced directly into the work.

Eighth. In causing a tool-support which is being fed in a single direction, and which has one or more tool supporting members mounted upon it, to move relatively to the tool-support, or other parts upon which it is mounted, by means of a pressure which is transmitted either directly to it or to a part or parts attached to it, and at the same time, during and as a part of the operation of regulating the rate at which the tool-support advances, in exerting a pressure upon the tool-support which opposes its advance, the pressure which causes the tool-support to advance being practically uniform throughout its period of action and tending in the same direction in which it is desired that the tool-support shall advance, while the resisting pressure offered to the tool-support during the operation of governing its rate of advance varies inversely as the pressure of the work—that is, becomes less as this pressure becomes greater, and greater as this pressure becomes less—and tends in the opposite direction to that in which it is desired that the tool-support shall advance, and in locating the center of pressure of the pressure which causes the tool-support to advance upon some portion of the tool-support, while the center of pressure of the pressure which offers resistance to the advance of the tool-support during the operation of regulating its rate of advance is located upon a tool-supporting member mounted upon the tool-support, thus causing not only the tool-support to which the advancing pressure is transmitted, but also one or more tool-supports which are mounted upon it, or upon which it is mounted, to deflect and to have their lost motion taken up in the same direction and to a practically uniform extent throughout the period of action of the feed mechanism and to cause the lost motion and deflection of the feed mechanism to be practically uniform, while at the same time the tool-support is only fed in one direction, thus allowing work to be done with a wide-nosed tool or cutter, which is advanced directly into the work. In many cases the pressure of the work upon the tool is in such a direction that a single feed mechanism acting on a tool-support cannot be so applied as to cause the tool-support to deflect in the same direction that the pressure of the tool would cause it to deflect. Further, although one feed mechanism can be applied to a tool-support in such manner as to take up the lost motion, not only of the tool-support to which it is applied, but also of the other tool-supporting members mounted upon it, in one direction, yet the pressure of the feed mechanism upon the tool-supports (tending to take up the lost motion in them) is not always in exactly the same direction as is that of the work upon the tool, so that one feed mechanism can only take up part of the detrimental lost motion in the tool-supports. It therefore in many cases becomes necessary to exert additional pressures upon the tool-supports besides those to which they are subjected by the feed mechanism, the function of these additional pressures being merely to put the tool-supports under such a strain as to cause them to deflect in the desired direction, and also to take up the lost motion of the tool-supports in that direction, while the function of the feed mechanism is not only to cause the tool-supports to deflect in another direction and the lost motion to be taken up on that direction, but also at the same time to feed the tool in the direction desired. In this case the additional pressure to which the tool-supports are subjected merely put the tool-supports under strain, but do not cause any of them to advance, while the pressures of the feed mechanism not only put the tool-supports under strain in a different direction, but also cause one of them to advance, and so make the tool feed.

The considerations above stated relate to the next feature of my invention, to wit:

Ninth. In causing a tool-support which is being fed in a single direction, and which has one or more tool-supporting members mounted upon it, to move relatively to the tool-support, or other parts upon which it is mounted, by means of a pressure which is transmitted either directly to it or to a part or parts attached to it, and at the same time, during and as a part of the operation of regulating the rate at which the tool-support advances, in exerting a pressure which opposes its advance, the pressure which causes the tool-support to advance tending in the same direction in which it is desired that the tool-support shall advance, while the resistance offered to the advance of the tool-support during the operation of governing its rate of advance tends in the opposite direction to that in which it is desired that the tool-support shall advance, and in locating the center of pressure of the pressure which causes the tool-support to advance upon some portion of the tool-support, while the center of pressure of the pressure which offers resistance to the advance of the tool-support during the operation of regulating its rate of advance is located upon a tool-supporting member mounted upon the tool-support, and at the same time in exerting a pressure upon one of the tool-supporting members mounted upon the tool-support which is being fed, which tends in the direction in which the tool-supporting member is adapted to feed relatively to the tool-support upon which it is mounted, and at the same time in exerting a pressure either upon this tool-supporting member or upon a tool-support mounted thereon, which prevents the tool-supporting member from feeding relatively to the tool-support upon which it is mounted, thus causing the lost motion in the feed mechanism to be taken up and the feed mechanism to deflect in the same direction before the tool comes in contact with the work, as the lost motion would be taken up and the feed mechanism would be made to deflect after the tool comes in contact with the work, and thus causing not only the tool-supports upon which the advancing pressure is exerted to deflect and to have its lost motion taken up, but also causing another tool-support mounted upon that last named, or upon which it is mounted, to have its lost motion taken up and to deflect in the same direction as the pressure of the work on the tool would cause these tool-supports to deflect and would take up their lost motion, while at the same time the tool-support is only fed in one direction, and therefore allowing work to be done with a wide-nosed tool or cutter, which is advanced directly into the work.

Tenth. In causing a tool-support which is being fed in a single direction, and which has one or more tool supporting members mounted upon it, to move relatively to the tool-support, or other parts upon which it is mounted, by means of a pressure which is transmitted either directly to it or to a part or parts attached to it, and at the same time, during and as a part of the operation of regulating the rate at which the tool-support advances, in exerting a pressure which opposes its advance, the pressure which causes the tool-support to advance tending in the same direction in which it is desired that the tool support shall advance, while the resistance offered to the advance of the tool-support during the operation of governing its rate of advance tends in the opposite direction to that in which it is desired that the tool-support shall advance, and in locating the center of pressure of the pressure which causes the tool-support to advance upon some portion of the tool-support, while the center of pressure which offers resistance to the advance of the tool-support during the operation of regulating its rate of advance is located upon a tool-supporting member mounted upon the tool-support, and in exerting a pressure upon one of the tool-supporting members upon which the tool-support which is being fed is mounted which tends in the direction in which this tool-supporting member is adapted to feed relatively to the parts upon which it is mounted, and at the same time in exerting a pressure either upon this tool-supporting member, or upon the tool-support mounted thereon, which prevents the tool-supporting member from feeding, thus causing the lost motion in the feed mechanism to deflect in the same direction before the tool comes in contact with the work, as the lost motion would be taken up and the feed mechanism would be made to deflect after the tool comes in contact with the work, and thus causing not only the tool-support upon which the advancing pressure is exerted to deflect and to have its lost motion taken up, but also causing another tool-support mounted upon that last named, or upon which it is mounted, to have its lost motion taken up and to deflect in the same direction as the pressure of the work on the tool would cause these tool-supports to deflect and would take up their lost motion, while at the same time the tool-support is only fed in one direction, and therefore allowing work to be done with a wide-nosed tool or cutter, which is advanced directly into the work.

Figure 2:
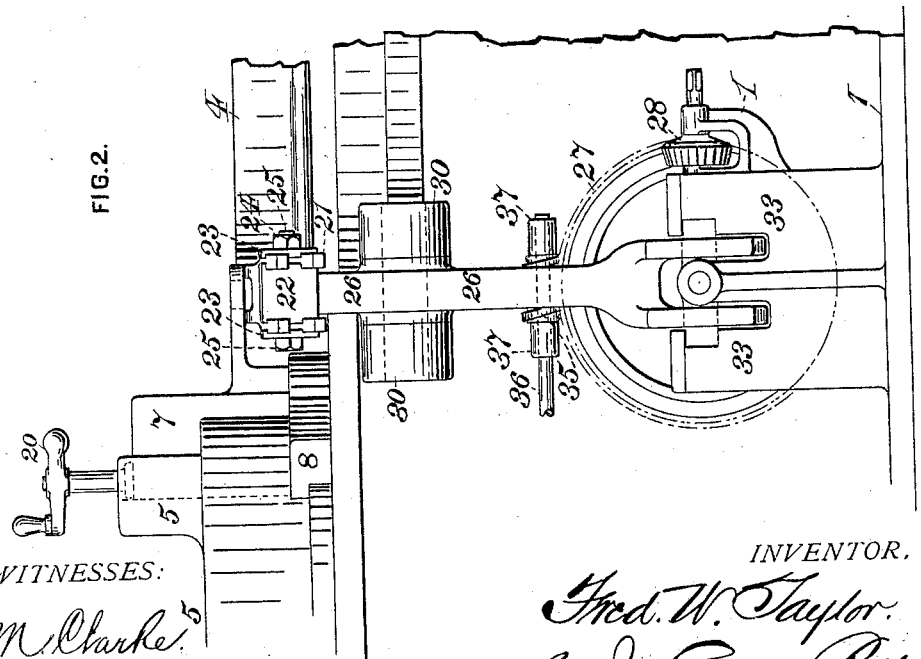
Figure 5:
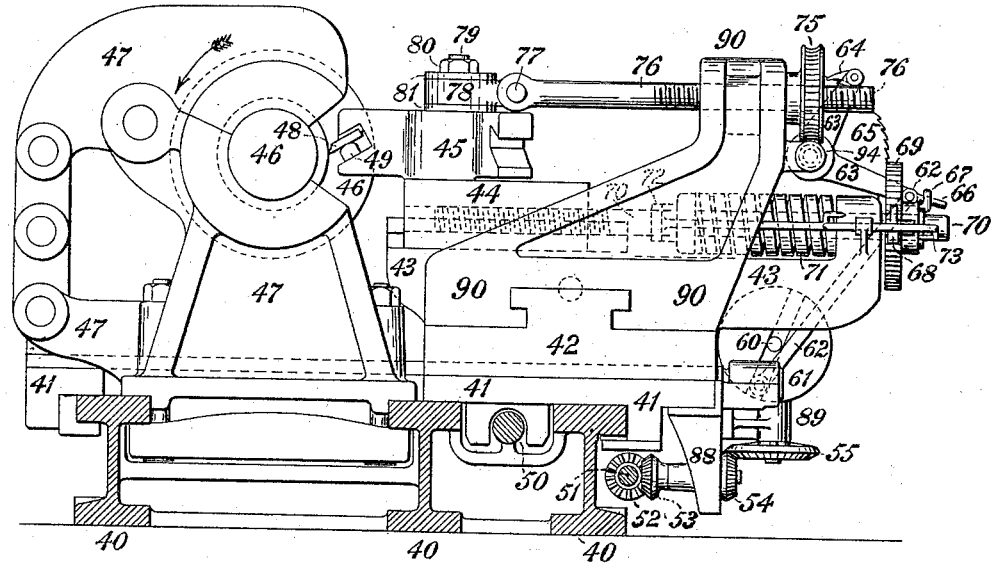
Figure 4:
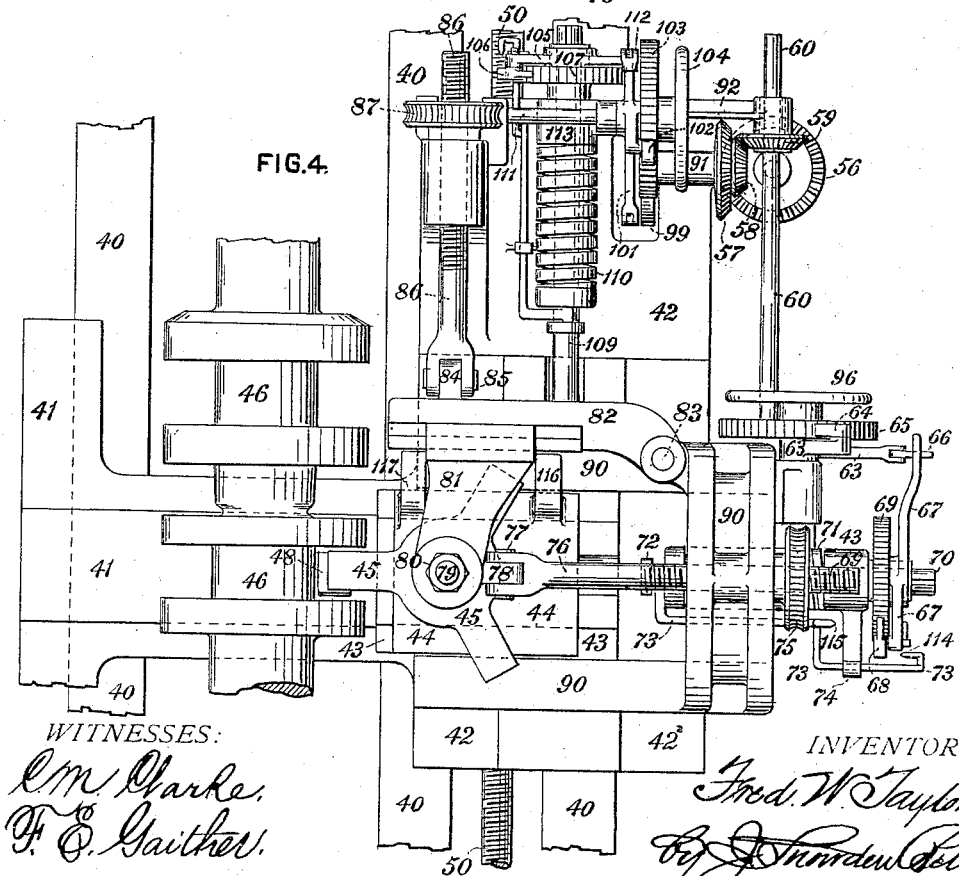

In the accompanying drawings, Figure 1 is a plan or top view of a special horizontal boring-mill designed for turning tires of locomotive or car wheels and embodying mechanism adapted for operation in accordance with my invention; Fig. 2, an end view of the same; Fig. 3, a side view, a portion of the feed mechanism being shown in section at the line $x$ $x$ of Fig. 1; Fig. 4, a plan or top view of a portion of a lathe adapted for operation in accordance with my invention; Fig. 5, an end view of the same, with the bed in section; Fig. 6, a side view, in elevation, of a portion of the same; Fig. 7, a view in elevation and on an enlarged scale, showing details of the feed mechanism; Fig. 8, a plan or top view of the same; and Fig. 9, a view, partly in elevation and partly in section, illustrating a modification of the feed mechanism.

In the practice of my invention I mount the tool-support or tool-supports upon any machine-tool which is adapted for using a cutting-tool in removing portions of forgings, castings, or other work which is being operated upon in the machine-tool. The tool-support may be mounted upon the machine-tool either directly or through the intermediation of another supporting member or members in the manner in which the tool-supports of machine-tools are ordinarily mounted. In exerting the pressure upon the tool-support which causes it to feed or advance, I employ any of the well-known trains of mechanism or devices which have been used in advancing tool-supports. I, however, prefer, for reasons hereinbefore mentioned, employing such trains of mechanism or devices as will exert a practically uniform pressure upon the tool-support in causing it to advance. The power used in actuating these trains of mechanism may be derived from any convenient source, or may be exerted by the operator of the machine.

In regulating the rate at which the tool-support advances, I employ any of the well-known trains of mechanism or devices which have heretofore been used in regulating the rate of advance of tool-supports. The trains of mechanism or devices used for regulating the rate of advance of the tool-support must, however, be so attached to the tool-support that they, while regulating its rate of advance, receive from the tool-support part of the pressure which has been transmitted to it from the mechanism which causes it to advance, thus opposing a resisting pressure to the advance of the tool-support. In other words, instead of employing the trains of mechanism or devices used in regulating the rate of advance of the tool-support to exert an advancing pressure upon the tool-support, as has heretofore been the case, I employ them so as to exert a pressure which resists the advance of the tool-support.

As hereinbefore stated, the resistances which were required to be overcome in the method heretofore employed for causing a tool-support to be fed consisted of the following elements: first, the resistance which the work offered to the advance of the tool; second, the friction between the tool-support which is being fed and the part or parts upon which it is mounted; and, third, the friction developed between the various parts of the feed-motion itself.

In the practice of my invention I introduce a fourth resistance which must be overcome in the operation of advancing a tool-support— namely, the resisting pressure exerted by the mechanism used in governing the rate of advance of the tool-support. Since the sum of all the resistances which oppose the advance of the tool-support must always equal the advancing pressure exerted upon it, when the advancing pressure is a practically uniform one, the resisting pressure offered by the rate-governing mechanism to the advance of the tool-support must vary inversely as the pressure of the work upon the tool, becoming greater as this pressure becomes less and less as it becomes greater, and therefore maintaining the tool-support under a uniform strain, which will cause it to deflect to a uniform extent.

The mechanism or appliance used in exerting the advancing pressure upon the tool-support may be so located that its center of pressure upon the tool-support coincides with the center of pressure of the mechanism or appliance used in regulating the rate of advance of the tool-support. I prefer, however, to locate the centers of pressure of the mechanism used in advancing the tool-support and the mechanism used in governing its rate of advance at different parts of the tool-support, so as to cause the tool-support to deflect in the same direction as the pressure of the work upon the tool causes them to deflect. When a tool-support has one or more tool-supporting members mounted upon it, I prefer to locate the center of pressure of the advancing mechanism upon the tool-support and to locate the center of pressure of the rate-governing mechanism upon one of the tool-supporting members mounted upon it, in order that the combined effect of the pressure exerted by the advancing mechanism and of the resistance offered by the rate-governing mechanism upon the tool-support may cause not only the tool-support which is being fed, but also the tool-supporting members mounted thereon, to deflect and have their lost motion taken up in the same direction that the pressure of the work on the tool will cause them to deflect and have their lost motion taken up.

It is not necessary that the direction of the pressure exerted by the advancing mechanism upon the tool-support should coincide exactly with the direction in which the tool-support advances under the action of this pressure. The advancing pressure should, however, tend in the same direction as that in which the tool-support advances. Neither is it necessary that the resisting pressure offered by the rate-governing mechanism to the advance of the tool support should be in exactly the opposite direction to that in which the tool-support advances. It is, however, necessary that this resistance should tend in the opposite direction.

In some cases the direction of the pressure of the work against the tool differs materially from the direction in which the tool-supports are being fed. In such cases, in the practice of my invention, when a tool-support having one or more tool-supporting members mounted upon it is being fed, I cause it to be advanced or fed in the manner just described above, thereby partially taking up the lost motion and deflection of the tool-support and the tool-supporting members mounted thereon, and in order to more fully take up the lost motion between the joints of the tool-support and the tool-supporting members, and to cause them to deflect more nearly in the direction in which the pressure of the work upon the tool would cause them to deflect, I exert a pressure upon one of the tool-supporting members that is mounted upon the tool-support which is being fed by means of any of the well-known methods of producing and transmitting pressure to a body which it is desired to maintain under pressure. I prefer that the pressure exerted upon this tool-supporting member should be a uniform one, and such pressure should tend in the direction in which the tool-supporting member is adapted to feed relatively to the tool-support which it is desired to feed. At the same time I exert a pressure either upon this tool-supporting member or upon another tool-support mounted thereon, which prevents the tool-supporting member from advancing or feeding relatively to the tool-support upon which it is mounted. This pressure, which prevents the tool-supporting member from feeding, is exerted upon it by connecting it to any of the adjacent portions of the machine by means of any of the well-known methods of connecting a movable portion of a machine to another portion of a machine when it is desired to prevent the movable part from moving. The resisting pressure opposed by this means to the tool-supporting member, and which prevents the tool-supporting member from feeding, must of course tend in the opposite direction to that of the pressure which tends to cause it to feed, the combined effect of these two pressures being to cause the tool-supports to deflect more nearly in the direction in which the pressure of the work upon the tool would cause them to deflect.

To facilitate the practical application of my invention by those skilled in the art to which it relates, I have illustrated in the drawings and will proceed to describe instances of machine-tools provided with feed mechanism the operation of which embodies the characteristic features of my invention and is effected and conducted under and in accordance with its governing principles.

The operative mechanism of the boring-mill shown in Figs. 1 to 3 is mounted and supported upon a main frame or body, 1, upon which a table or face-plate, 2, is fitted to be driven or caused to rotate by any suitable driving mechanism. Fig. 1 shows, in dotted lines, the teeth of a gear attached to the outside of the table and serving to drive the same. A tire, 4, is shown as attached to the table 2, so as to be rigidly supported thereon in position for turning off its tread by a cutting-tool, 9. The cutting-tool in this case consists of a broad cutter, which extends the full width of the part of the tire which it is desired to turn. This cutter is pressed by means of a wedge, 12, which is drawn tight by a screw, 13, against a shoe, 10, which is supported by the vertical tool-slide 7. This vertical slide is supported and guided by a swinging slide, 5, which is supported and guided at its outer end and upon the main body 1 of the machine, and is held down thereon by the clamps 8 and the bolts 14. The entire slide 5 pivots or swings about the post 6, around which it fits and by which it is supported, the post 6 being either integral with or attached to the main frame or bed of the machine.

In the feed-motion which is used to feed the tool against the tire the advancing mechanism consists of a cylinder, 15, which is adapted to be supplied with water or steam, or other liquid or gas under compression. The cylinder 15 is mounted upon trunnions, the upper one of which, 16, is shown in the drawings. These trunnions are supported by and abut against the elevated portions 17 of the main frame. Proper pipes and valves for supplying the cylinder with the liquid or gas under pressure are arranged so as to enable the pressure of the liquid or gas to be exerted in forcing the piston toward either end of the cylinder at the will of the operator of the machine. The cylinder 15 is fitted with a suitable piston secured upon a piston-rod, 18, the outer end of which is coupled by a pair of trunnions, 19, to the swinging slide 5.

The rate-governing mechanism is of the following construction: A connecting link, casting, or forging, 21, is connected at one end by a swinging joint to the vertical slide 7 at a greater distance from the guiding-surface of the vertical slide which fits in the swinging slide 5 than the distance of the tool from said guiding-surface. The connecting link, casting, or forging 21 is provided with a movable stop-block, 22, which can be moved into different positions along the connecting-link and clamped fast thereto in any desired position by means of a bolt, 25, and nut 24, and the two washers 23. This stop block is shown as pressing against the upper arm of a doublearmed lever, 26, which pivots upon and is supported by a pin, 29, fitting in a bearing, 30, projecting from the main frame of the machine. The lower arm of the lever 26 carries a nut, 31, having on each side a trunnion fitting in a suitable bearing in the lever, so that the nut may remain in a horizontal position as the lever moves out of a perpendicular position. The nut 31 engages a releasing-screw, 32, having a thread of very rapid pitch. The screw 32 is fitted to rotate in bearings 33, fixed to the main frame, and is provided with collars 34, by which its end motion is prevented.

The angular pitch of the thread of the screw 32 should be of such steepness and the supporting-collar 34 of such dimensions that a pressure brought by the nut upon the screw will be almost sufficient to cause the screw to rotate and allow the nut to run down, or the angular pitch of the thread of the screw and the proportions of the collar 34 should be such that a pressure brought to bear by the nut upon the thread will insure, under all circumstances, the rotation of the screw and allow the nut to run down it; but in this case the angular pitch of the screw and the dimensions of the collar should be such that a pressure upon the nut will not cause the screw to turn with great rapidity. To illustrate the requirements more clearly, it should be stated that a certain angular pitch of a screw-thread will, in combination with a certain dimension of the thrust-collar on the screw, just insure the turning of a screw-thread when the nut which engages it is subjected to pressure. In the application of this part of my invention the pitch of the screw-thread and the dimensions of the collar should be designed in one of two ways—to wit, either that when the pressure is brought upon the nut the screw-thread will almost but not quite turn, or that the pressure of the nut will insure the turning of the screw, while at the same time it will not force it to turn too easily.

The reason for proportioning the screw and the collar thereon in either of these ways is that under either of the conditions mentioned a comparatively small amount of power will suffice, when applied to the screw, to affect its rotation, as the pressure of the nut upon the screw induces a strong tendency to rotation in the latter. It would not be practicable for the pitch of the screw and the design of the collar to be otherwise than in accordance with the two conditions above stated, as it would then sometimes be doubtful whether it would require a slight push to start the feed-motion to working or a pull to prevent it from working. Upon the end of the releasing-screw 32 is fixed a worm-wheel, 27, on one side of which is cast a bevel-gear, 27$^a$, meshing with a corresponding pinion, 28, which may be operated by an ordinary crank-handle applied to the squared end of its shaft, and not shown in the drawings. The worm-wheel 27 meshes with a worm, 35, fixed upon a worm shaft, 36, which is supported by a rocker-bearing, 37, pivoted to a pin, 38, on the frame. The worm 35 can be thrown out of gear with the worm-wheel 27 by pivoting the rocker-bearing 37 around its pin 38. The worm-shaft 36, which is shown as broken off in the drawings, is to be connected by a suitable train of feed gearing either to a member of the mechanism which drives the table of the machine or to any other suitable prime mover, as the case may require.

The operation of the feed mechanism is as follows: Assuming that the tool 9 has been moved to within a short distance of the piece of work 4, the upper part of the lever 26 should then be slightly farther away from the work than it now is. The stop-block 22, having been rigidly fastened to the connecting link, casting, or forging 21, is brought to a firm bearing against the upper end of the lever 26. Liquid or gas under pressure being admitted to the back end of the cylinder 15, so as to produce a pressure upon the piston tending to force it toward the front end of the cylinder, the pressure from this liquid or gas will be transmitted by the piston-rod 18 and trunnions 19 to the swinging slide 5, thus inducing a heavy pressure upon the swinging slide 5, tending to force it and the vertical slide 7, which is attached to it, toward the work 4. Since, as above explained, the connecting-link 21 is fastened at one end to the vertical slide 7, and has a bearing-block, 22, attached to it and bearing against the lever 26, the slide is prevented from moving toward the work until the lower end of the lever is allowed to move by turning the feed-screw, which can be done by operating the feed-motion. It will be observed that by the combined strain of the advancing mechanism and the rate governing mechanism, as described, both the swinging slide 5 and the vertical slide 7 are put under heavy strain, which is quite as great as, if not greater than, the pressure which the tool would induce upon them, thus causing them both to deflect in the same direction, and to an extent as great as or greater than they would be caused to deflect by the pressure of the work upon the tool, and taking up all of the lost motion between the joint of the vertical slide 7 and swinging slide 5, also between the slide 5 and its supporting-post 6, to the same extent as or a greater extent than the lost motion would be taken up by the pressure of the work upon the tool. While the advancing and rate-governing mechanisms and all parts of the slides 5 and 7 are under this strain, let it be assumed that the worm 35 is thrown out of gear with its worm-wheel 27. This worm-wheel can then be made to rotate by the attachment of a hand-crank to the shaft of the small bevel-wheel 28, and the rotation of the worm-wheel 27 will cause the releasing-screw 32 to rotate and allow the lower end of the lever 26 to move in such direction that the upper end of this lever will approach the work, thus allowing the tool to approach the work until it begins to cut it. Thereupon the worm can be again thrown into gear with the worm-wheel, and the feed-motion from this point on be made automatic. It will be observed that by this means there is no greater tendency on the part of the tool or the slides supporting it to chatter or deflect after the tool is at work than before it begins to operate.

When sufficient metal has been removed from the work, the tool can be readily withdrawn therefrom by transferring the pressure of the liquid or gas from the back to the front end of the cylinder, thus causing all of the parts of the slide to move back easily and quickly, however heavy they may be and however tightly they may be supported by the guides.

The hand-crank 20 shown in the drawings is fixed on the end of an ordinary feed-screw, which, engaging in a suitable nut attached to the frame 5, causes the slide 7 to be fed either up or down, as the case may require. Instead of this hand-feed, one of my improved feed mechanisms may be employed. In such case the advancing mechanism should be arranged so as to abut against a suitable support attached to the swinging slide 5. The advancing mechanism should then push down the vertical slide 7 close to the bearing of this slide in the swinging slide 5, while the rate-governing mechanism should be attached so as to pull up upon the slide 7 at a part of the slide farther away from the swinging slide 5 than the advancing mechanism pushes from it. Under such construction the combined strain of the advancing and rate-governing mechanisms would cause the slide 7 to deflect upward in the same manner that the pressure of the work against the cutting-tool, arranged so as to cut beneath the slide, would cause it to deflect.

It is further to be noted that the rate-governing mechanism shown in the drawings need not necessarily be attached, as shown, to the vertical slide 7, as it may, if preferred, be attached to the swinging slide 5. The advancing mechanism could then occupy the same position as shown in the drawings. The combined strain of the advancing and rate-governing mechanisms would then cause the swinging slide 5 to deflect in approximately the same direction and to approximately the same extent that the pressure of the work against the cutting-tool would cause this slide to deflect. Such an arrangement of the advancing and rate-governing mechanisms would not, however, be as satisfactory nor attain the same end as the construction shown in the drawings, since the slide 7 would still deflect under the pressure of the work against the tool, and the lost motion in the joint between the slides 7 and swinging slide 5 could not be taken up. The rate-governing mechanism could, further, be attached to the piston-rod 18 of the advancing mechanism; but in such case many of the advantages of the feed-motion, as shown and described, would not be available. Both the advancing and rate-governing mechanisms would then constitute a feed-motion operating upon the same slide.

A practical application of my invention in feeding the cutting-tool of a large lathe provided with two feed mechanisms, each consisting of an advancing and a rate-governing mechanism, both pairs acting on the support for the same tool at the same time, is illustrated in Figs. 4 to 9, inclusive, and, referring to said figures, will now be described.

In order that the strain may be brought upon the cutting-tool in such manner as to render the application of the feed-motion simple and effective, the lathe is run in the opposite direction to that in which lathes are ordinarily run, so that the pressure of the work upon the cutting-tool tends to cause the tool to deflect upward and outward, instead of downward and outward, as is usually the case. Upon the shears or bed 40 of the lathe are mounted two housings, 47, adapted to receive the neck of a roll, 46, which is the work upon which, in this case, the lathe is shown as operating. The work is rotated in the direction indicated by the arrow in the drawings, in the manner in which rolls are ordinarily driven when in a lathe; but the direction in which the roll is rotated is, however, the opposite to that in which rolls are usually rotated when in a lathe. A saddle, 41, is mounted upon the lathe-bed, and is adapted to be moved along the shears of the lathe by means of a leading-screw, 50, which is similar to leading-screws generally employed for this purpose. To the top of the saddle 41 is bolted a heavy casting, 42, on the upper part of which is shown a raised portion, which is provided with a flange on either side for receiving and supporting a tool-support, this portion being planed true and parallel in all parts to the center line or axis of the work 46. Upon this casting 42, and fitting closely around and underneath the elevated flanges thereof, is mounted a tool-support, 43, which is guided as it is moved in a direction parallel to the center line of the work by the raised and flanged portion of the casting 42, as above referred to. The upper portion of the tool-support 43 is provided with flanges similar to those used on the elevated portion of the part 42, but which are, however, planed so as to be at right angles to the center line of the work. Upon the tool-support 43 is mounted another tool-support, 44, the lower portion of which is planed so as to fit underneath the flanges planed on the upper surface of the tool-support 43. The tool-support 44 is adapted to slide freely on these flanges as guides, so as to either approach or recede from the center line of the work, as required. Upon the tool-support 44 is mounted a tool-holder, 45, which is adapted to be turned upon the axis of a stud-bolt, 79, by which it is secured to the tool-support 44. A tool, 48, is firmly wedged into place in one of the three tool-holding receptacles of the tool-holder 45 by means of a wedge, 49. A brace, 90, which is a casting consisting of two heavy legs joined together at the top, has its bottom surface planed, so as to fit around the elevated and flanged portion of the casting 42, one of the legs of the brace 90 being on each side of the tool-support 43, so that whenever the latter is slid either backward or forward along the upper surface of the casting 42 the brace 90 participates in its movement. A cylindrical shaft, 51, (shown in section in Fig. 5 and side elevation in Fig. 6,) is driven by gearing connected with the live-spindle of the lathe. A longitudinal keyway is cut in the shaft 51, in which fits a key fixed to a bevel-gear, 52, so that the gear 52, while rotating with the shaft 51, is free to move endwise thereon in correspondence with the backward and forward movements of the saddle 41 of the lathe. A bevel-gear, 53, meshing with the gear 52, is mounted on a short shaft having its bearing in a bracket, 88, which is attached to the saddle 41. On the other end of this shaft is fixed a bevel-gear, 54, which drives a larger bevel-gear, 55, secured upon the lower end of a vertical shaft, which is supported in a bracket, 89, attached to the lathe-saddle 41. A bevel-gear, 56, is fixed upon the upper end of the shaft of the bevel-gear 55, the bevel-gear 56 driving a bevel-gear, 57, mounted on a shaft which is supported by a bracket, 91, attached to lathe-saddle 41. A bevel-gear, 58, fixed upon the end of the shaft of the bevel-gear 57, drives a bevel-gear, 59, which is mounted on a shaft, 60, the shaft 60 being splined longitudinally to receive a key fixed to the gear 59, so that although the shaft 60 is rotated by the bevel-gear 59 it is free to slide endwise backward and forward through said bevel-gear as the tool-support 43 is slid backward or forward on the part 42. One end of the shaft 60 is guided and supported by a bracket, 92, which is attached to the lathe-saddle 41, while the other end of this shaft is supported by a bracket attached to the tool-support 43. On the end of the shaft 60, adjacent to the bearing in which it is supported on the tool-support 43, is fixed a crank-disk, 61, which is provided with a slot in its face, into which a crank-pin is fitted in such manner that it can be slid either toward or from the center of the disk, and clamped fast in any desired position, so that when the crank-disk 61 is caused to rotate by the shaft 60 the crank-pin revolves with the disk in a circle of greater or less diameter in accordance with its adjustment. This crank-pin is coupled by a connecting-rod, 62, to a bell-crank, 63, journaled on the brace 90, and as the crank-pin revolves with the disk 61 the bell-crank 63 is thereby oscillated about the axis of the shaft upon which it is mounted. It will be seen that the bell-crank 63 oscillates through a larger or a smaller angle, according as the crank-pin is farther from or nearer to the center of the crank-disk 61. To the upper arm of the bell-crank 63 is pivoted a pawl, 64, which overhangs a ratchet-wheel, 65. As the bell-crank 63 oscillates backward and forward, the pawl 64 engages the teeth of the ratchet-wheel 65 and causes it to rotate intermittently through a certain arc, the range of motion of the ratchet-wheel depending upon the degree of the angle of oscillation of the bell-crank, it being possible to adjust the crank-pin in the crank-disk 61, so that each revolution of the crank shall cause the ratchet-wheel 65 to rotate through the space occupied by one or more of the teeth on its circumference, as the case may require. The ratchet-wheel 65 is keyed fast on the shaft 93, upon which a worm, 94, is also secured. This worm engages a worm-wheel, 75, upon the inside of which is cut an internal thread, which engages a screw, 76, so that when the worm-wheel 75 is rotated the screw 76 is caused to move in one or the other direction, as the case may require. The worm-wheel 75 abuts against and is supported by the brace 90, through an opening in which the screw 76 passes freely. The other end of the screw 76 is coupled to a ring, 78, by means of a pin, 77, which passes through a hole bored through two forks in the end of the screw 76, and through a projection on the ring 78. The ring 78 is bored to fit freely around the stud-bolt 79, thus allowing the tool-holder 45 to be pivoted around the same on the top of the tool-support 44.

A projecting pin, 66, is fixed on the end of one of the arms of the bell-crank 63, around which pin is fitted the end of a rocker-arm, 67, the hole through which the pin 66 passes being slotted, so as to allow the rocker-arm 67 to oscillate about the shaft 70, such movement of the rocker-arm being effected by the oscillation of the arm of the bell-crank 63. On the other end of the rocker-arm 67 is journaled a pawl, 68, which is so attached to the rocker-arm 67 that it can be either thrown in and made to engage the ratchet-wheel 69, or held out of gear from the ratchet-wheel 69 by means of a spring, 97, which is shown in Fig. 7. The ratchet-wheel 69 fits on and is connected by a key with the shaft 70, this shaft being splined for about one-third of its length, so as to permit of end motion of the shaft backward or forward through the ratchet-wheel 69. When, however, the ratchet-wheel 69 is rotated, the shaft 70 is caused by the key to rotate with it. This shaft passes through and is supported by a bearing on the outer extremity of the tool-support 43. The portion of the shaft 70 farthest removed from the bearing 43 has a screw-thread cut upon it, said thread engaging a female thread cut in a hole traversing the tool-support 44. The shaft 70 is provided at about the middle of its length with a large collar, which may be either rigidly fastened to or made part of the shaft, as preferred. A powerful spring, 71, is placed under compression between the bearing on the end of the tool-support 43 and the large collar on the shaft 70, thus exerting throughout the period of action of the feed-motion a powerful pressure upon shaft 70, which is transmitted from that shaft to tool-support 44.

The operation of the feed mechanism above described is as follows: The shaft 51, which is driven either by a prime mover, a countershaft, or, preferably, by the gearing which drives the lathe-spindle, transmits its motion, by means of the bevel-gears 52, 53, 54, 55, 56, 57, 58, and 59, which are mounted upon suitable shafts and supported in suitable bearings, as before described, to the shaft 60. The crank-disk 61, fixed on the end of shaft 60, can be kept in motion throughout the time that the lathe is in operation, or be stopped, at the will of the operator, by stopping or starting the shaft 51, and by means of the connecting-rod 62 and crank 61 the bell-crank 63 can be kept oscillating throughout the time of action of the lathe, the degree of the angle of oscillation being dependent upon the adjustment of the crank-pin in the slot of the crank-disk 61. The rocker-arm 67 being continuously in motion, the pawl 68 is made to engage the teeth on the circumference of the ratchet-wheel 69, and at every oscillation of the rocker-arm 67 the ratchet-wheel 69 rotates through a certain portion of a revolution, thereby causing coincident rotation of the shaft 70. The screw on the other end of the shaft 70 gradually disengages itself from the female screw in the tool-support 44, thereby causing the collar on the shaft 70 to approach the bearing on the outer end of the tool-support 43, and compressing the spring 71 between this collar and the bearing. If the tool-support 44 were not restrained from moving toward the work 46 by means of the screw 76, which draws upon the stud 79, attached to the tool-holder 45, the constant pressure of the spring 71 upon the tool-support 44 would cause it to move rapidly forward in the direction of the work. The spring 71 can be tightened so as to produce any desired degree of pressure upon tool-support 44, and when tightened to the desired extent the pawl 68 is thrown out of gear with the ratchet-wheel 69, thus rendering the tool-support 44 subject to a constant and uniform pressure from the spring 71, which pressure tends to advance the tool-support toward the work. The rate of advance of the tool-support is, however, in no wise affected by the shaft 70, the spring 71, or the mechanism used for tightening the same.

The rate at which the tool-support 44 is fed or advanced is governed by the following mechanism: Throughout the period that the spring 71 is under tension the pressure of the spring upon the tool-support 44 is opposed partly by the resistance of the work to the advance of the tool and partly by the screw 76, which is attached to the top of the tool-holder 45. Up to the time that the tool begins to cut the work the whole pressure of the spring 71 is resisted by the screw 76, and when the tool begins to cut the greater the resistance offered to the tool by the work the less will be the strain sustained by the screw 76. The screw 76 and the tool-holder 45, which is attached thereto, are allowed to advance toward the work by unscrewing the internal thread of the worm-wheel 75, which engages the screw 76, and the rate at which the tool-holder 45 and screw 76 advance will depend upon the rate at which the worm-wheel 75 is rotated. The worm-wheel 75 may be made to rotate by turning the shaft 93, upon which the worm 94 is mounted, so as to engage the worm-wheel 75. The shaft 93 may be rotated either by turning the hand-wheel 96, attached thereto, or by the ratchet-wheel 65, which is moved, as hereinbefore explained, by the rocker-arm 63 and pawl 64. The rate of advance of the tool-support 44 and the tool-holder 45, mounted thereon, is then dependent upon the rate at which either the hand-wheel 96 or the ratchet-wheel 65 is respectively rotated.

The bell-crank 63, pawl 64, ratchet-wheel 65, shaft 93, worm 94, worm-wheel 75, and screw 76 form a train of mechanism for regulating the rate at which the tool-support 44 and the part mounted thereon advance toward the work. This mechanism illustrates one form of rate-governing mechanism which on operation exemplifies the characteristic features of such mechanism, as hereinbefore specified to in writing the specification.

The rocker-arm 67, pawl 68, ratchet-wheel 69, shaft 70, and spring 71 together constitute a train of mechanism for effecting the advance of the tool-support 44 toward the work, and this train serves as one example of the mechanism which has been hereinbefore referred to as an advancing mechanism.

The above-described trains of advancing and rate-governing mechanism are used for feeding the tool-support 44 and the tool-holder 45, mounted thereon; and since both of these trains of mechanism subject the tool-support and tool-holder to powerful strain throughout the period of their action, they take up the lost motion in the joints between the tool-support 44 and the tool-support 43, as well as between the tool-holder 45 and the tool-support 44, and at the same time cause both the tool-holder 45 and the tool-support 44 to deflect even before the tool comes in contact with the work as much as or more than they would deflect under the pressure of the work against the tool, thus preventing the chatter and vibration incident to tool-supports and tool-holders as heretofore constructed.

The tool-support 43 is fed backward and forward upon the guides, around which it fits on the casting 42, by means of two trains of mechanism, one for causing the advance of the tool-support and the other for regulating the rate at which this advance takes place, the parts of said mechanisms being substantially identical in form and in function with those of the two trains of mechanism which are used for feeding tool-support 44. The operation of the feed mechanisms of the tool-support 43 is as follows: On the other end of the shaft to which the bevel-gear 57 is attached farthest from said gear is fixed a crank-disk, 99, similar to the crank-disk 61 before described. The connecting-rod 100 connects an adjustable disk, 99, with the end of the bell-crank 101. This bell-crank is oscillated by means of the connecting-rod 100 around the shaft 111, and carries on one end a pawl, 102, which engages the teeth on the circumference of a ratchet-wheel, 103, which is mounted upon a shaft, 111. A hand-wheel, 104, is also secured upon the end of this shaft, on the other end of which is fixed a worm which engages and drives a worm-wheel, 87, in a manner similar to that in which the worm 94 drives worm-wheel 75. The inside of the worm-wheel 87 has cut upon it a screw-thread to engage the thread of the screw 86. The bell-crank 101 is provided with a third arm, 112, the end of which arm is coupled by a connecting-rod, 108, to a rocker-arm, 105. The rocker-arm 105 is mounted in a manner similar to the rocker-arm 67 upon the hub of a ratchet-wheel, 107, and is caused to oscillate freely about this hub by means of the connecting-rod which couples it with the bell-crank 101. On the other end of the rocker-arm 105 is journaled a pawl, 106, which can be thrown into gear with the ratchet-wheel 107, thus causing the latter to rotate through a greater or less angle, according to the angle of oscillation of the rocker arm.

The ratchet-wheel 107 is bored out to fit around the shaft 109, and is provided with a key which engages a keyway cut in the shaft 109, so as to effect the coincident rotation of the shaft and the ratchet-wheel, and at the same time to admit of free backward and forward movement of the shaft through the ratchet-wheel. The other end of the shaft 109 has a screw cut upon it, which engages a female thread cut in a hole bored in the tool-support 43. A spring, 110, bears at its ends against a collar fixed on the shaft 109, near the middle thereof, and against a bearing, 113, which is attached to or forms part of the casting 42. The spring 110 is tightened by means of the rocker-arm 105, pawl 106, ratchet-wheel 107, and shaft 109 to any desired degree of tension and transmits its pressure through the shaft 109 to the tool-support 43 in a manner similar to that in which the spring 71 is tightened and transmits its pressure to the tool-support 44 by means of the rocker-arm 67, pawl 68, ratchet-wheel 69, and shaft 70. A clevis-casting, 81, fits around the stud-bolt 79, which is attached to the tool-holder 45, (the link 78 fitting between the upper and lower forks of the clevis 81,) so that the tool-holder 45 can be pivoted about on the tool support 44 without altering the position of the clevis-casting 81. The end of the clevis-casting farthest from the tool-holder 45 is planed to fit around guides upon the casting 82.

As the tool-support 44 is moved backward and forward upon the tool-support 43, the two arms 116 and 117, which project from the tool-support 44, cause the clevis-casting 81 to move backward and forward with the tool support 44, the planed portion of the clevis 81 sliding backward and forward and being guided by the planed portion of the casting 82. A boss, 84, which is either fixed to or formed as a part of the casting 82, is coupled by means of a pin, 85, to the clevis on the end of the screw 86, so that when the tool-support 43 is subjected to pressure from the spring 110 either the whole or a part of this pressure is transmitted through the tool support 44, tool-holder 45, clevis-casting 81, and guide-casting 82 to the screw 86. The guide-casting 82 is connected by a pivot, 83, to the brace 90, in order to allow for lost motion in the fitting of the clevis 81 to the guide 82, and also to allow for a slight wear between the surfaces of these parts. It is, however, not absolutely necessary that guide 82 should be pivoted to the brace 90, as it might, if preferred, be cast rigidly upon it, since the brace 90 accompanies the tool support 43 as it slides backward and forward while being fed. The rate at which the tool-support 43 is fed backward and forward is regulated by the motion of the bell-crank 101, pawl 102, ratchet-wheel 103, shaft 111, worm-wheel 87, and the worm mounted on shaft 111, which drives this wheel and screw 86 in a manner similar to that in which the rate of advance of the tool support 44 is regulated by the bell-crank 63, pawl 64, shaft 93, worm 94, worm-wheel 75, and screw 76.

It is desirable that each of the springs 71 and 110 should exert a uniform pressure, respectively, through their pressure-transmitters 70 and 109 upon the tool-supports which the springs are intended to feed throughout the time of their action. Having tightened either of these springs—as, for example, the spring 71—to the desired degree of tension, it can be kept under a uniform tension by having the rocker-arm 67, ratchet-wheel 69, and the pitch of the thread on the screw 70 so proportioned with relation to the arm of the bell-crank 63, to which the pawl 64 is attached, and the ratchet-wheel 65, worm 94, worm-wheel 75, and the pitch of the thread on the screw 76, that a single oscillation of the bell-crank 63 will cause the shaft 70 to be screwed out of the tool-support 44 to exactly the same distance that the screw 76 is allowed to advance through the same stroke of the bell-crank 63. I have, however, shown a mechanism for automatically maintaining each of these springs under any desired tension, the same being illustrated on a small scale in Figs. 4, 5, and 6, and on a larger scale in Figs. 7 and 8. A rod, 73, is connected to shaft 70 between the small collar 72 on this shaft and the large collar which takes the thrust of the spring 71, the connection of the rod with the shaft being such as to permit it to partake of the longitudinal movements of the latter without rotating therewith. The rod 73 is bent in several directions, and is guided in its motion by passing through a slotted guide, 74, which supports it, close to the pawl 68. The two points 114 and 115 are attached to bent rod 73, and are so placed that one of them, 115, can be made to strike against the upper prong on the pawl 68, while the other, 114, can be made to strike against the lower projection on the pawl 68.

The method of operating this mechanism for maintaining the spring at the proper tension is as follows: Assuming that the pawl 68 is adjusted in the position in which it is seen in Figs. 7 and 8—namely, so that it is entirely disengaged from the ratchet-wheel 69—it is held in this position by means of the spring 97, which presses against a small flat surface formed upon the pin 98, which is attached to and projects from the body of the pawl 68. When the pawl is in this position, the rocker-arm 67 may oscillate any number of times without affecting the ratchet-wheel 69. Now, supposing the pawl 64 to be engaged with the ratchet-wheel 65, the oscillation of the bell-crank 63 will allow the screw 76 to advance toward the work. The screw 70, being pushed by the spring 71, will of course advance to the extent that is allowed by the screw 76. The bent rod 73 is, however, carried forward with the shaft 70 until the projection 114 is brought across the path in which the pawl 68 is oscillated. When the projection 114 has come far enough across this path, the projecting prong on the pawl, as it oscillates downward, comes in contact with the projection 114, which causes the pawl to pivot about its bearing on the rocker-arm 67 until it engages the ratchet-wheel 69. When it has reached this position, it is maintained in contact with the ratchet-wheel by the spring 97, which then presses upon the other small flat surface formed upon the projecting pin 98. Every oscillation of the rocker-arm 67 then causes the shaft 70 to be unscrewed from the tool-support 44, thus gradually tightening up the spring 71 by causing the shaft 70 to move out away from the tool-support 44. As this shaft moves out, it causes the upper projection, 115, on the rod 73 to approach the path along which the pawl 68 is oscillating. When the projection 115 crosses this path of oscillation, it disengages the pawl from the ratchet-wheel, again bringing it back to the position in which it is seen in Figs. 7 and 8. By properly adjusting the position of the projections 114 and 115 with relation to one another and to the pawl 68 they may be made, by throwing the pawl in and out of gear with the ratchet-wheel, as explained, to maintain the spring 71 approximately at any desired degree of tension.

Fig. 9 illustrates a modification of the feed mechanism above described as applied and similarly operating to feed the tool-support 43 in the lathe shown in Figs. 4, 5, and 6. Only such of the parts illustrated in Fig. 6 as will suffice to clearly explain the operation of this modification are, however, shown in Fig. 9. A rod, 116, is secured to or forms part of the tool-support 43, which is not shown in Fig. 9, but which corresponds in form and location with the tool-support 43, (shown in the adjoining Fig. 6,) the rod 116 being attached to the tool-support in the same position as the shaft 109 illustrated in Fig. 6. A piston-rod, 126, is also attached, by a pin, 85, and boss 84, to the casting 82, these parts being the same as those illustrated in Fig. 6. A cylinder, 117, bored to receive a hydraulic piston, 120, is formed integral with or secured to the end of the rod 116, the rod 121 of the piston 120 passing through the cylinder-cover 118, which is bolted to the end of the cylinder 117, and being packed by the gland 119. The end of the rod 121 farthest from the cylinder is rigidly bolted to a bearing, 125, by a nut, 124, the bearing 125 being either a part of or rigidly attached to the casting 42. Water is conveyed to or from one side of the piston 120 within the cylinder 117 by a pipe, 122, communicating with a small longitudinal passage extending through the piston-rod and piston, and is conveyed to or from the other side of the piston 120 through a pipe, 123, communicating with a passage extending through the piston and opening into the cylinder adjacent to the piston. A hydraulic cylinder, 129, is fixed upon the top of a standard or bracket, 133, which is rigidly attached to or forms part of the casting 42. The piston-rod 126, which is provided with a clevis at the end, through which the pin 85 fits, enters the hydraulic cylinder 129 through the gland 127, by which it is packed, and within the cylinder this rod is secured to the piston 128. Water is admitted to and allowed to pass out from one end of this cylinder through pipe 132, governed by a valve, 134, and is admitted to and passes out from the other end of the cylinder through a pipe, 135, governed by a valve, 131, these valves being so constructed that when water is admitted to the cylinder they can either be closed, so as to entirely prevent its escape, or opened to any desired extent to allow the water to escape either very slowly or faster, at the will of the operator.

The method of operating the feed mechanism above described is as follows: Water under heavy pressure is admitted to the cylinder 117, which is transmitted through the rod 116 to the tool-support 43, this pressure tending constantly to move the tool-support 43 in the direction in which it is transmitted thereto. If the tool-support 43 were free to move, it would of course be advanced by this pressure until the piston 120 came in contact with one or the other end of the cylinder. The rate, however, at which the tool-support 43 is allowed to advance is regulated by the piston-rod 126, the end of which is connected, by means of the casting 82, clevis-casting 81, stud-bolt 79, tool-support 45, and tool-support 44, to the tool-support 43. The advance of the piston-rod 126 is either entirely prevented or regulated to any desired rate of speed, as the case may require, by the water which is inclosed within the cylinder between the piston 128 and one or the other end of the cylinder, this water being allowed to escape at any desired rate, or being entirely prevented from escaping by the valves 134 and 135. I do not, however, consider this means of regulating the rate at which the tool-support advances to be as desirable as the more positive mechanism shown in Fig. 6, for the reason that the exact regulation of the rate of feed may be much more readily effected with the screw, worm, and worm-wheel, &c., illustrated in said figure. I consider, however, the advancing mechanism, consisting of the hydraulic cylinder 117, piston 120, &c., shown in Fig. 9 to be preferable to either of the advancing mechanisms shown in Figs. 4, 5, and 6, being much simpler and more readily and rapidly adjusted.

The trains of advancing and rate-governing mechanism which have been hereinbefore described for causing the tool-support 43 and the parts mounted thereon to feed backward and forward upon the support 42, and for governing the rate at which these parts are fed, maintain throughout the period of their action not only the tool-support 43, but also the tool-support 44 and the tool-holder 45, and all of the joints in the advancing and rate-governing mechanisms under substantial strain, thus causing them to deflect to as great or a greater extent and in the same direction that the pressure of the work on the tool would cause them to deflect, and at the same time taking up the lost motion between the joints of all of these parts, thus preventing the chatter and vibration which would otherwise take place under the action of feeding mechanisms as heretofore used.

A special feature of advantage in the operation of these two feed mechanisms is that while one of them is being used for advancing one of the tool-supports the other can be made to maintain the tool-support which it is intended to feed, as well as the other tool-support and parts attached thereto, continually under strain without the necessity of causing the tool-support to advance, thus preventing chatter and vibration in the direction in which both feed mechanisms are adapted to take up the lost motion. Thus, for example, if spring 71 and screw 76 are being employed and the tool-support 44 and tool-holder 45 caused to approach the central axis of the lathe, and it should not be desired that the tool-support 43 should move parallel to the axis of the lathe, a strain can be exerted through the combined pressure of the spring 110 and screw 86 not only upon the tool-support 43, but also upon the tool-support 44 and the tool-holder 45, causing them to deflect and taking up the lost motion between their joints in a direction at right angles to that in which the spring 71 and screw 76 take up their lost motion and cause them to deflect.

It is frequently necessary, owing to the shape of the tool being used and the work which is being operated upon, to thus take up the lost motion and cause the tool-supports and parts attached to them to deflect in two directions at the same time, although the tool itself is actually moving only in one direction. This is a very important feature of my invention. If the angular pitch of the threads on the screws 76 and 86 are sufficiently steep, it will require but little effort to allow the tool-supports which they are intended to feed to advance, so that the hand-wheels 96 and 104 can be used for this purpose even if the tool-supports are subject to a very severe strain from the springs 71 and 110. Another important feature of my invention is the fact that the heavier the pressure of the work upon the tool the easier it becomes to operate the rate-governing mechanism, since a larger portion of the strain which is at other times transmitted to these mechanisms through the tool-supports is then received by the tool.

To facilitate the description of my improvement, I have found it advisable to embody in the drawings mechanism and accessories which do not form a necessary part thereof, and which are therefore not claimed as of my present invention. The same, so far as embodying patentable subject-matter invented by me, will be the subject of a separate application or applications to be filed by me in due season.

I claim as my invention and desire to secure by Letters Patent—

1. The improvement in the art of feeding a tool-support in a single direction, which consists in advancing the tool-support by a pressure exerted thereon, and simultaneously, during and as a part of the operation of regulating its rate of advance, in opposing a resisting pressure thereto, and in locating the centers of pressure of said advancing and resisting pressures at different points upon the tool-support, so as to cause the lost motion in the joints of the tool-support to be taken up and the tool-support to deflect in the same direction as the pressure of the work upon the tool causes the lost motion to be taken up and the tool-support to deflect, substantially as set forth.

2. The improvement in the art of feeding a tool-support in a single direction, which consists in advancing the tool-support by a pressure exerted thereon, and simultaneously, during and as a part of the operation of regulating its rate of advance, in opposing a resisting pressure thereto, the advancing pressure tending in the same direction in which it is desired that the tool-support shall advance, while the resisting pressure tends in the opposite direction to that in which it is desired that it shall advance, and in locating the centers of pressure of said advancing and resisting pressures at different points upon the tool-support as to cause the lost motion in the joints of the tool-support to be taken up and the tool-support to deflect in the same direction as the pressure of the work upon the tool causes the lost motion to be taken up and the tool-support to deflect, substantially as set forth.

3. The improvement in the art of feeding in a single direction a tool-support having one or more tool-supporting members mounted thereon, which consists in advancing the tool-supports by a pressure exerted thereon, and simultaneously, during and as a part of the operation of regulating its rate of advance, in opposing a resisting pressure thereto, and in locating the center of pressure of the advancing pressure upon some portion of the tool-support, while the center of pressure of the resisting pressure is located upon one of the tool-supporting members mounted thereon, substantially as set forth.

4. The improvement in the art of feeding in a single direction a tool-support having one or more tool-supporting members mounted thereon, which consists in advancing the tool-support by a pressure exerted thereon, and simultaneously, during and as a part of the operation of regulating its rate of advance, in opposing a resisting pressure thereto, the advancing pressure tending in the same direction in which it is desired that the tool-support shall advance, while the resisting pressure tends in the opposite direction to that in which it is desired that it shall advance, and in locating the center of pressure of the advancing pressure upon some portion of the tool-support, while the center of pressure of the resisting pressure is located upon one of the tool-supporting members mounted thereon, substantially as set forth.

5. The improvement in the art of feeding a tool-support in a single direction, which consists in advancing the tool-support by a pressure exerted thereon, and simultaneously, during and as a part of the operation of regulating its rate of advance, in opposing a resisting pressure thereto, the advancing pressure being substantially uniform, while the resisting pressure varies inversely as the pressure of the work upon the tool—that is, becomes less as this pressure becomes greater, and greater as this pressure becomes less—and in locating the centers of pressure of said advancing and resisting pressures upon different parts of the tool-support, so as to cause the lost motion in the joints of the tool-support to be taken up and the tool-support to deflect in the same direction as the pressure of the work upon the tool causes the lost motion to be taken up and the tool-support to deflect, substantially as set forth.

6. The improvement in the art of feeding a tool-support in a single direction, which consists in advancing the tool-support by a pressure exerted thereon, and simultaneously, during and as a part of the operation of regulating its rate of advance, in opposing a resisting pressure thereto, the advancing pressure being substantially uniform and tending in the same direction in which it is desired that the tool-support shall advance, while the resisting pressure varies inversely as the pressure of the work upon the tool—that is, becomes less as this pressure becomes greater, and greater as this pressure becomes less—and tends in the opposite direction to that in which it is desired that it shall advance, and in locating the centers of pressure of said advancing and resisting pressures at different points upon the tool-support, so as to cause the lost motion in the joints of the tool-support to be taken up and the tool-support to deflect in the same direction as the pressure of the work upon the tool causes the lost motion to be taken up and the tool-support to deflect, substantially as set forth.

7. The improvement in the art of feeding in a single direction a tool-support having one or more tool-supporting members mounted thereon, which consists in advancing the tool-support by a pressure exerted upon it, and simultaneously, during and as a part of the operation of regulating its rate of advance, in opposing a resisting pressure thereto, the advancing pressure being practically uniform, while the resisting pressure varies inversely as the pressure of the work upon the tool—that is, becomes less as this pressure becomes greater, and greater as this pressure becomes less—and in locating the center of pressure of the advancing pressure upon some portion of the tool-support, while the center of pressure of the resisting pressure is located on one of the tool-supporting members mounted thereon, substantially as set forth.

8. The improvement in the art of feeding in a single direction a tool-support having one or more tool-supporting members mounted thereon, which consists in advancing the tool-support by a pressure exerted upon it, and simultaneously, during and as a part of the operation of regulating its rate of advance, in opposing thereto a resisting pressure, the advancing pressure being practically uniform and tending in the same direction in which it is desired that the tool-support shall advance, while the resisting pressure varies inversely as the pressure of the work upon the tool—that is, becomes less as this pressure becomes greater, and greater as this pressure becomes less—and tends in the opposite direction to that in which it is desired that the tool-support shall advance, and in locating the center of pressure of the advancing pressure upon some portion of the tool-support, while the center of pressure of the resisting pressure is located upon one of the tool-supporting members mounted thereon, substantially as set forth.

9. The improvement in the art of feeding in a single direction a tool-support having one or more tool-supporting members mounted thereon, which consists in advancing the tool-support by a pressure exerted thereon, and simultaneously, during and as a part of the operation of regulating its rate of advance, in opposing a resisting pressure thereto, and in locating the center of pressure of the advancing pressure upon some portion of the tool-support, while the center of pressure of the resisting pressure is located upon one of the tool-supporting members mounted thereon, and in exerting a pressure upon one of the tool-supporting members mounted upon the tool-support which is being fed, which tends in the direction in which this tool-supporting member is adapted to feed relatively to the tool-support upon which it is mounted, and at the same time in exerting pressure either upon this tool-supporting member or upon a tool-support mounted thereon, which prevents the tool-supporting member from feeding, so as to cause the lost motion in the tool-support to be taken up and the tool-support to deflect in the same direction as the pressure of the work on the tool would cause this lost motion to be taken up and the tool-support to deflect, substantially as set forth.

10. The improvement in the art of feeding in a single direction a tool-support having one or more supporting members mounted thereon, which consists in advancing the tool support by a pressure exerted thereon, and simultaneously, during and as a part of the operation of regulating its rate of advance, in opposing a resisting pressure thereto, and in locating the center of pressure of the advancing pressure upon some portion of the tool support, while the center of the resisting pressure is located upon one of the tool-supporting members mounted thereon, and in exerting a pressure upon one of the tool-supporting members upon which the tool-support which is being fed is mounted, which tends in the direction in which this tool-supporting member is adapted to feed relatively to the parts upon which it is mounted, and at the same time in exerting a pressure either upon the tool support which is being fed or upon a tool-support mounted thereon, which prevents the tool-supporting member from feeding, so as to cause the lost motion in the tool support to be taken up and the tool-support to deflect in the same direction as the pressure of the work on the tool would cause this lost motion to be taken up and the tool-support to deflect, substantially as set forth.

FRED. W. TAYLOR.

Witnesses:
A. M. PECKHAM,
N. JAMES DE BLOIS.